(12) United States Patent
Rothstein et al.

(10) Patent No.: US 9,054,952 B2
(45) Date of Patent: *Jun. 9, 2015

(54) AUTOMATED PASSIVE DISCOVERY OF APPLICATIONS

(71) Applicant: ExtraHop Networks, Inc., Seattle, WA (US)

(72) Inventors: Jesse Abraham Rothstein, Seattle, WA (US); Arindum Mukerji, Seattle, WA (US); Bhushan Prasad Khanal, Seattle, WA (US)

(73) Assignee: ExtraHop Networks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/107,580

(22) Filed: Dec. 16, 2013

(65) Prior Publication Data

US 2014/0280907 A1 Sep. 18, 2014

Related U.S. Application Data

(63) Continuation of application No. 13/831,626, filed on Mar. 15, 2013, now Pat. No. 8,626,912.

(51) Int. Cl.
*G06F 15/173* (2006.01)
*H04L 12/26* (2006.01)
*H04L 29/08* (2006.01)

(52) U.S. Cl.
CPC ............... *H04L 43/04* (2013.01); *H04L 43/18* (2013.01); *H04L 67/16* (2013.01); *H04L 67/36* (2013.01); *H04L 67/303* (2013.01)

(58) Field of Classification Search
CPC .................. H04L 29/08009; H04L 69/32

USPC ........................................... 709/224
See application file for complete search history.

(56) References Cited

U.S. PATENT DOCUMENTS

| | | |
|---|---|---|
| 5,430,727 A | 7/1995 | Callon |
| 5,541,995 A | 7/1996 | Normile et al. |
| 5,787,237 A | 7/1998 | Reilly |
| 5,802,599 A | 9/1998 | Cabrera et al. |

(Continued)

OTHER PUBLICATIONS

Official Communication for U.S. Appl. No. 13/831,626, mailed Sep. 3, 2013.

(Continued)

*Primary Examiner* — Esther B Henderson
(74) *Attorney, Agent, or Firm* — John W. Branch; Lowe Graham Jones PLLC

(57) ABSTRACT

Embodiments are directed to monitoring communication over a network using a network monitoring device (NMD) to discover devices, roles, applications, and application dependencies present on the monitored networks. A NMD may monitor network packets that may be flowing on monitored networks. Using OSI L2-to-L3 data the NMD may determine the devices that may be on the monitored networks. Also, the NMD may determine the network protocols that may be in use on the monitored networks. Further, the NMD may reassemble monitored network packets into transactions based on knowledge regarding the network protocols are in use on the monitored networks. The NMD may perform various tests to determine the applications that may be running on the discovered devices. Some of the tests used by the NMD may examine OSI L4-L7 data that may be included in the transactions.

20 Claims, 10 Drawing Sheets

(56) References Cited

U.S. PATENT DOCUMENTS

| | | | |
|---|---|---|---|
| 5,835,726 | A | 11/1998 | Shwed et al. |
| 6,141,686 | A | 10/2000 | Jackowski et al. |
| 6,401,150 | B1 | 6/2002 | Reilly |
| 6,765,909 | B1 | 7/2004 | Sen et al. |
| 6,807,156 | B1 | 10/2004 | Veres et al. |
| 7,089,326 | B2 | 8/2006 | Boucher et al. |
| 7,193,968 | B1 | 3/2007 | Kapoor et al. |
| 7,313,141 | B2 | 12/2007 | Kan et al. |
| 7,480,292 | B2 | 1/2009 | Busi et al. |
| 7,545,499 | B2 | 6/2009 | Overbeck et al. |
| 7,602,731 | B2 | 10/2009 | Jain |
| 7,864,764 | B1 | 1/2011 | Ma et al. |
| 7,979,555 | B2 | 7/2011 | Rothstein et al. |
| 8,079,083 | B1 | 12/2011 | Bennett et al. |
| 8,125,908 | B2 | 2/2012 | Rothstein et al. |
| 8,185,953 | B2 | 5/2012 | Rothstein et al. |
| 8,411,677 | B1 | 4/2013 | Colloff |
| 8,619,579 | B1 | 12/2013 | Rothstein et al. |
| 2002/0024964 | A1 | 2/2002 | Baum et al. |
| 2002/0080720 | A1 | 6/2002 | Pegrum et al. |
| 2002/0091844 | A1 | 7/2002 | Craft et al. |
| 2003/0152094 | A1 | 8/2003 | Colavito et al. |
| 2003/0204621 | A1* | 10/2003 | Poletto et al. ............ 709/239 |
| 2003/0214913 | A1 | 11/2003 | Kan et al. |
| 2004/0003094 | A1 | 1/2004 | See |
| 2004/0047325 | A1 | 3/2004 | Hameleers et al. |
| 2004/0088557 | A1 | 5/2004 | Malcolm et al. |
| 2004/0093513 | A1 | 5/2004 | Cantrell et al. |
| 2004/0250059 | A1 | 12/2004 | Ramelson et al. |
| 2005/0060427 | A1 | 3/2005 | Phillips et al. |
| 2005/0091357 | A1 | 4/2005 | Krantz et al. |
| 2005/0100000 | A1 | 5/2005 | Faulkner et al. |
| 2005/0182833 | A1 | 8/2005 | Duffie et al. |
| 2005/0210242 | A1 | 9/2005 | Troxel et al. |
| 2006/0029096 | A1 | 2/2006 | Babbar et al. |
| 2006/0045017 | A1 | 3/2006 | Yamasaki |
| 2006/0123477 | A1 | 6/2006 | Raghavan et al. |
| 2007/0088845 | A1 | 4/2007 | Memon et al. |
| 2007/0156919 | A1 | 7/2007 | Potti et al. |
| 2007/0192863 | A1* | 8/2007 | Kapoor et al. ............ 726/23 |
| 2008/0062995 | A1 | 3/2008 | Kaas |
| 2008/0069002 | A1 | 3/2008 | Savoor et al. |
| 2008/0130659 | A1 | 6/2008 | Polland |
| 2008/0141275 | A1 | 6/2008 | Borgendale et al. |
| 2008/0222717 | A1 | 9/2008 | Rothstein et al. |
| 2009/0225675 | A1 | 9/2009 | Baum et al. |
| 2009/0245083 | A1 | 10/2009 | Hamzeh |
| 2009/0296593 | A1 | 12/2009 | Prescott |
| 2010/0091770 | A1 | 4/2010 | Ishikawa |
| 2010/0095367 | A1 | 4/2010 | Narayanaswamy |
| 2010/0250928 | A1 | 9/2010 | Goto |
| 2010/0316216 | A1 | 12/2010 | Fukushima et al. |
| 2010/0322248 | A1 | 12/2010 | Ivanov |
| 2011/0019574 | A1 | 1/2011 | Malomsoky et al. |
| 2011/0073490 | A1 | 3/2011 | Hayamizu et al. |
| 2011/0280149 | A1 | 11/2011 | Okada et al. |
| 2012/0176917 | A1 | 7/2012 | Matityahu et al. |
| 2012/0215328 | A1 | 8/2012 | Schmelzer |
| 2012/0243533 | A1 | 9/2012 | Leong |
| 2012/0294305 | A1 | 11/2012 | Rose et al. |
| 2013/0010608 | A1 | 1/2013 | Ramachandran et al. |
| 2013/0042323 | A1* | 2/2013 | Narayanaswamy et al. .... 726/23 |
| 2013/0061036 | A1 | 3/2013 | Oliver |
| 2013/0064084 | A1 | 3/2013 | Babbar et al. |
| 2013/0103734 | A1 | 4/2013 | Boldyrev et al. |
| 2013/0166730 | A1 | 6/2013 | Wilkinson |
| 2013/0232104 | A1 | 9/2013 | Goyal et al. |
| 2014/0040451 | A1 | 2/2014 | Agrawal et al. |
| 2014/0142972 | A1* | 5/2014 | Hosenfeld, Jr. ............ 705/2 |

OTHER PUBLICATIONS

OA Communication for U.S. Appl. No. 13/831,673 mailed on Sep. 30, 2013.

OA Communication for U.S. Appl. No. 13/831,673 mailed on Mar. 6, 2014.

OA Communication for U.S. Appl. No. 13/831,673 mailed on May 22, 2014.

OA Communication for U.S. Appl. No. 14/518,996 mailed on Nov. 20, 2014.

OA Communication for U.S. Appl. No. 13/831,908 mailed on Jun. 25, 2014.

OA Communication for U.S. Appl. No. 14/500,893 mailed on Nov. 20, 2014.

OA Communication for U.S. Appl. No. 13/831,908 mailed on Apr. 7, 2014.

OA Communication for U.S. Appl. No. 13/831,908 mailed on Jan. 13, 2014.

OA Communication for U.S. Appl. No. 13/831,908 mailed on Aug. 22, 2013.

Handel et al. "Hiding Data in the OSI Network Model," Los Alamos, New Mexico, 1996, 16 pages.

OA Communication for U.S. Appl. No. 14/107,631 mailed on Feb. 20, 2014.

OA Communication for U.S. Appl. No. 14/107,631 mailed on Sep. 26, 2014.

Handley et al., "Network Intrusion Detection: Evasion, Traffic Normalization, and End-to-End Protocol Semantics," 2011, International Computer Science Institute, 17 pages.

Information Sciences Institute, "Internet Protocol Darpa Internet Program Protocol Specification," Sep. 1981, 36 pages.

Fuertes, "Evaluation of OSPF Extensions in MANET Routing," Paris, 2007, 192 pages.

Parsons, "Moving Across the Internet: Code-Bodies, Code-Corpses, and Network Architecture," May 9, 2010, 20 pages.

Zander et al., "Covert Channels and Countermeasures in Computer Network Protocols," Dec. 2007, 7 pages.

OA Communication for U.S. Appl. No. 14/500,893 mailed on Feb. 18, 2015.

OA Communication for U.S. Appl. No. 14/107,631 mailed on Dec. 30, 2014.

* cited by examiner

AUTOMATED PASSIVE DISCOVERY OF APPLICATIONS

CROSS-REFERENCE TO RELATED APPLICATIONS

The present application is a Continuation of U.S. application Ser. No. 13/831,626 filed Mar. 15, 2013, entitled "AUTOMATED PASSIVE DISCOVERY OF APPLICATIONS," the benefit of the earlier filing date of which is hereby claimed under 35 U.S.C. §120 and 37 C.F.R. §1.78, and which is further incorporated by reference.

TECHNICAL FIELD

The present invention relates generally to network monitoring, and more particularly, but not exclusively, to discovering applications that may be operative over a network.

BACKGROUND

On most computer networks, bits of data arranged in bytes are packaged into collections of bytes called packets. These packets are generally communicated between computing devices over networks in a wired and/or wireless manner. A suite of communication protocols is typically employed to communicate between at least two endpoints over one or more networks. The protocols are typically layered on top of one another to form a protocol stack. One model for a network communication protocol stack is the Open Systems Interconnection (OSI) model, which defines seven layers of different protocols that cooperatively enable communication over a network. The OSI model layers are arranged in the following order: Physical (1), Data Link (2), Network (3), Transport (4), Session (5), Presentation (6), and Application (7). Another model for a network communication protocol stack is the Internet Protocol (IP) model, which is also known as the Transport Communication Protocol/Internet Protocol (TCP/IP) model. The TCP/IP model is similar to the OSI model except that it defines four layers instead of seven. The TCP/IP model's four layers for network communication protocol are arranged in the following order: Link (1), Internet (2), Transport (3), and Application (4). To reduce the number of layers from four to seven, the TCP/IP model collapses the OSI model's Application, Presentation, and Session layers into its Application layer. Also, the OSI's Physical layer is either assumed or is collapsed into the TCP/IP model's Link layer. Although some communication protocols may be listed at different numbered or named layers of the TCP/IP model versus the OSI model, both of these models describe stacks that include basically the same protocols. For example, the TCP protocol is listed on the fourth layer of the OSI model and on the third layer of the TCP/IP model. Additionally, the HTTP protocol is listed on the seventh layer of the OSI model and on the fourth layer of the TCP/IP model.

To assess and troubleshoot communicated packets and protocols over a network, different types of network monitors can be employed. One type of network monitor, a "packet sniffer" may be employed to generally monitor and record packets of data as they are communicated over a network. Some packet sniffers can display data included in each packet and provide statistics regarding a monitored stream of packets. Also, some types of network monitors are referred to as "protocol analyzers" in part because they can provide additional analysis of monitored and recorded packets regarding a type of network, communication protocol, or application.

Generally, packet sniffers and protocol analyzers passively monitor network traffic without participating in the communication protocols. In some instances, they receive a copy of each packet on a particular network segment or VLAN from one or more members of the network segment. In other instances, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces. In still other instances packet copies may be provided to the network monitors from a specialized network tap.

In some instances, a network monitor may operate as a proxy that is actively arranged between two endpoints, such as a client device and a server device. A network monitor proxy intercepts each packet sent by each endpoint and retransmits or forwards each intercepted packet to the other endpoint. Since network monitor proxies actively monitor network packets, they often enable a variety of additional services such as caching, content filtering, and access control.

Furthermore as information technology infrastructure becomes more complex and more dynamic it may be more difficult to determine and monitor which devices and applications may be operative on a network. Also, the complexity may make it difficult, especially in large networks, for determining dependencies among the network devices and applications that are operative on the networks.

However, the sheer volume of packets that are regularly communicated over networks in even a short period of time has made it relatively difficult and/or inefficient for network monitors to record, store, and analyze all monitored packets in a readily accessible format that is both useful for analysis and helpful for troubleshooting a particular issue or event in a timely manner.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
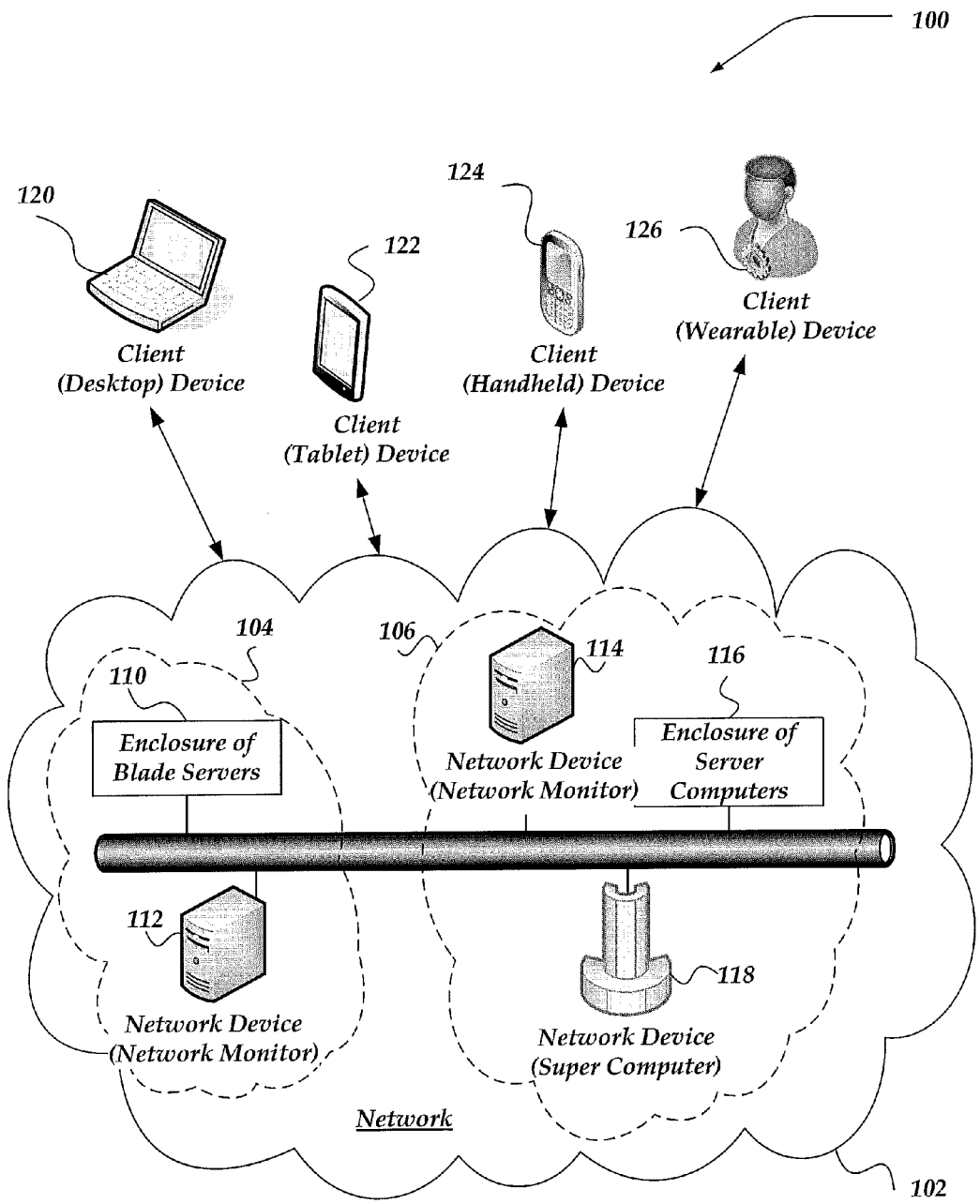
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein, the term "session" refers to a semi-permanent interactive packet interchange between two or more communicating endpoints, such as network devices. A session is set up or established at a certain point in time, and torn down at a later point in time. An established communication session may involve more than one message in each direction. A session may have stateful communication where at least one of the communicating network devices saves information about the session history to be able to communicate. A session may also provide stateless communication, where the communication consists of independent requests with responses between the endpoints. An established session is the basic requirement to perform a connection-oriented communication. A session also is the basic step to transmit in connectionless communication modes.

As used herein, the term "connection" refers to a communication session with a semi-permanent connection for interactive packet interchange between two or more communicating endpoints, such as network devices. The connection is established before any useful data is transferred, and where a stream of data is delivered in the same order as it was sent. The alternative to connection-oriented transmission is connectionless communication. For example, the datagram mode of communication used by the Internet Protocol (IP) and the Universal Datagram Protocol (UDP) may deliver packets out of order, since different packets may be routed independently and could be delivered over different paths.

Connection-oriented communication may be a packet-mode virtual circuit connection. For example, a transport layer virtual circuit protocol such as the TCP protocol can deliver packets of data in order although the lower layer switching is connectionless. A connection-oriented transport layer protocol such as TCP can also provide connection-oriented communications over connectionless communication. For example, if TCP is based on a connectionless network layer protocol (such as IP), this TCP/IP protocol can then achieve in-order delivery of a byte stream of data, by means of segment sequence numbering on the sender side, packet buffering and data packet reordering on the receiver side. Alternatively, the virtual circuit connection may be established in a datalink layer or network layer switching mode, where all data packets belonging to the same traffic stream are delivered over the same path, and traffic flows are identified by some connection identifier rather than by complete routing information, which enables fast hardware based switching.

As used herein, the terms "session flow" and "flow" refer to one packet or a stream of packets that are communicated in a session that is established between at least two endpoints, such as two network devices. In at least one of the various embodiments, flows may be useful if one or more of the endpoints of a session may be behind a network traffic management device, such as a firewall, switch, router, load balancer, or the like. In at least one of the various embodiments, such flows may be used to ensure that the packets sent between the endpoints of a flow may be routed appropriately.

Typically, establishing a TCP based connection between endpoints begins with a handshake and creates a single bi-directional flow between two endpoints, e.g., one direction of flow going from endpoint A to endpoint B, the other direction of the flow going from endpoint B to endpoint A, where endpoint A and endpoint B are IP-Port source and destinations. In at least one of the various embodiments, a tuple may be employed to identify a flow. Also, other protocols may establish a separate flow for control information that enables management of at least one or more flows between two or more endpoints.

As used herein, the terms "network monitor", "network monitor device", or "NMD" refer to an application (software, hardware, or some combination) that is arranged to monitor and record flows of packets in a session that are communicated between at least two endpoints over at least one network. The NMD can provide information for assessing different aspects of these monitored flows. In at least one embodiment, the NMD passively monitors network packet traffic without participating in the communication protocols. This monitoring is performed for a variety of reasons, including troubleshooting and proactive remediation, end-user experience monitoring, SLA monitoring, capacity planning, application lifecycle management, infrastructure change management, infrastructure optimization, business intelligence, security, and regulatory compliance. The NMD can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

The NMD may track network connections from and to end points such as a client and/or a server. The NMD may also extract information from the packets including protocol information at various layers of the communication protocol stack. The NMD may reassemble or reconstruct the stream of data exchanged between the endpoints. The NMD may perform decryption of the payload at various layers of the protocol stack. The NMD may passively monitor the network traffic or it may participate in the protocols as a proxy. The NMD may attempt to classify the network traffic according to communication protocols that are used.

The NMD may also perform one or more actions for classifying protocols that may be a necessary precondition for application classification. While some protocols run on well known ports, others do not. Thus, even if there is traffic on a well known port, it is not necessarily the protocol generally understood to be assigned to that port. As a result, the NMD may perform protocol classification using one or more techniques, such as, signature matching, statistical analysis, traffic analysis, and other heuristics. In some cases, the NMD may use adaptive protocol classification techniques where information used to classify the protocols may be accumulated and/or applied over time to further classify the observed protocols. The NMD may categorize the traffic where categories might include file transfers, streaming audio, streaming video, database access, interactive, gaming, and the like. The NMD may attempt to determine whether the traffic corresponds to known communications protocols, such as HTTP, FTP, SMTP, RTP, TDS, TCP, IP, and the like.

As used herein, the terms "layer" and "model layer" refer to a layer of one or more communication protocols in a stack of communication protocol layers that are defined by a model, such as the OSI model and the TCP/IP (IP) model. The OSI model defines seven layers and the TCP/IP model defines four layers of communication protocols.

For example, at the OSI model's lowest or first layer (Physical), streams of electrical/light/radio impulses (bits) are communicated between computing devices over some type of media, such as cables, network interface cards, radio wave transmitters, and the like. At the next or second layer (Data Link), bits are encoded into packets and packets are also decoded into bits. The Data Link layer also has two sub-layers, the Media Access Control (MAC) sub-layer and the Logical Link Control (LLC) sub-layer. The MAC sub-layer controls how a computing device gains access to the data and permission to transmit it. The LLC sub-layer controls frame synchronization, flow control and error checking. At the third layer (Network), logical paths are created, known as virtual circuits, to communicated data from node to node. Routing, forwarding, addressing, internetworking, error handling, congestion control, and packet sequencing are functions of the Network layer. At the fourth layer (Transport), transparent transfer of data between end computing devices, or hosts, is provided. The Transport layer is responsible for end to end recovery and flow control to ensure complete data transfer over the network.

At the fifth layer (Session) of the OSI model, connections between applications are established, managed, and terminated. The Session layer sets up, coordinates, and terminates conversations, exchanges, and dialogues between applications at each end of a connection. At the sixth layer (Presentation), independence from differences in data representation, e.g., encryption, is provided by translating from application to network format and vice versa. Generally, the Presentation layer transforms data into the form that the protocols at the Application layer (7) can accept. For example, the Presentation layer generally handles the formatting and encrypting/decrypting of data that is communicated across a network.

At the top or seventh layer (Application) of the OSI model, application and end user processes are supported. For example, communication partners may be identified, quality of service can be identified, user authentication and privacy may be considered, and constraints on data syntax can be identified. Generally, the Application layer provides services for file transfer, messaging, and displaying data. Protocols at the Application layer may include FTP, HTTP, and Telnet. Also, application layer protocols may include, wire protocols used by relational databases (RDBMS), message queues, caches, and so on. Additionally, some of the application layer protocols may use an open specification and/or open standard while others may have proprietary specifications.

To reduce the number of layers from seven to four, the TCP/IP model collapses the OSI model's Application, Presentation, and Session layers into its Application layer. Also, the OSI's Physical layer is either assumed or may be collapsed into the TCP/IP model's Link layer. Although some communication protocols may be listed at different numbered or named layers of the TCP/IP model versus the OSI model, both of these models describe stacks that include basically the same protocols.

As used herein, the term "discovered device" refers to devices that have been detected and identified as operating on one or more of the networks being monitored by a NMD. The NMD may determine that a device is discovered if it detects a network packet that has been unequivocally emitted by that device. In most cases, the NMD may use the MAC address and VLAN of the detected device as its identifier. In at least one of the various embodiments, the NMD may be configured to ignore certain network devices so not every network device operative on the monitored networks may be recognized as a discovered device.

As used herein, the terms "application transactional streams," "application transaction," and "transaction" refer to an application level transmission over the network that may be broken up into multiple network packets. For example, if the size of a transaction exceeds the Maximum Transmission Unit (MTU) for a network it will be broken up into smaller network packets for transmission over the network and reassembled after it reaches its destination. In at least one of the various embodiments, the NMD may reassemble one or more network packets into a transaction before performing additional analysis.

As used herein, the term "device profile" refers to the properties, characteristics and relationships for a discovered device that may have been detected by the NMD. Device profiles may include information, such as, vender, roles, applications, dependencies, MAC addresses, OSI Layer 3 address information (IP addresses associated with device), or the like. A device profile may be used to collect the information the NMD discovers about a device. In at least one of the various embodiments, device profiles may be arranged into explicit data structures or they may be implicit abstractions of the properties and characteristics of discovered devices.

As used herein, the term "application profile" refers to properties and characteristics of an application that have been determined by an NMD to be operative on a monitored network. An application profile may include various discovered characteristics, such as, application name, application version, application dependencies, or the like. Application profiles may be included in the device profiles of the discovered devices that may be determined by the NMD to be running (e.g., servers) and/or using the application (e.g., clients). The information included in a application profile for a particular application may vary depending on what the NMD is able to determine from the monitored network packets. In at least one of the various embodiments, application profiles may be arranged into explicit data structures or they may be implicit abstractions of the properties and characteristics of applications detected by the NMD.

As used herein, the term "operating system profile" refers to properties and characteristics of an operating system that have been determined by an NMD to be operative on a discovered device. An operating system profile may include various discovered characteristics, such as, name, manufacturer, version, or the like. Operating system profiles may be included in the device profiles of the discovered devices. The information may included in a particular operating system profile may vary depending on what the NMD is able to determine from the monitored network packets. Further, the device profile for a discovered device may include multiple operating system profiles if the NMD determines that multiple operating systems may be operative on the discovered device. In at least one of the various embodiments, operating system profiles may be arranged into explicit data structures or they may be implicit abstractions of the properties and characteristics of operating systems detected by the NMD.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to monitoring communication over a network with using network monitoring device (NMD) that may perform actions that include discovering devices, roles, applications, and application dependencies that may be present on the monitored networks.

In at least one of the various embodiments, a NMD may monitor a plurality of network packets that may be flowing on one or more monitored networks. In at least one of the various embodiments, using L2-to-L3 data the NMD may determine one or more devices that may be on the monitored networks. Also, in at least one of the various embodiments, the NMD may determine the network protocols that may be in use on the monitored networks. Further, in at least one of the various embodiments, the NMD may reassemble one or more monitored network packets into one or more transactions based on knowledge regarding the network protocols that may be in use on the monitored networks.

In at least one of the various embodiments, the NMD may perform various tests to determine the one or more applications that may be running on one or more of the devices. In at least one of the various embodiments, at least some of the tests used by the NMD may examine the application layer data (OSI Layer 4 and above) that is included in the transactions.

In at least one of the various embodiments, the NMD may use information determined by examining the application layer data to create one or more application profiles that each include at least an identity of the application. In at least one of the various embodiments, these application profiles may be associated with the at least one device.

In at least one of the various embodiments, the NMD may examine the monitored network packets to determine the operating systems may be associated with the devices on the monitored networks. In at least one of the various embodiments, the NMD may examine and test the application layer data included in the monitored packets for determining details about the operating systems that may be otherwise difficult to discern.

In at least one of the various embodiments, the NMD may further analyze the monitored packets and transactions to determine application dependencies that may exist between the various devices that may be operative on the monitored networks. In at least one of the various embodiments, the NMD may determine application dependencies based on at least a comparison of multiple transactions that may be associated different devices. In at least one of the various embodiments, correlations that may be discovered may indicate the device may be associated with one or more application that may be dependent on each other.

In at least one of the various embodiments, the NMD may correlate data from two or more transactions that may be on separate network flows based on application layer data included in each transaction. Thus, in at least one of the various embodiments, transactions that may appear to be unrelated because they may be on separate flows may be identified as correlated based on their application layer data.

Illustrative Operating Environment

FIG. 1 shows components of an environment in which various embodiments may be practiced. Not all of the components may be required to practice the various embodiments, and variations in the arrangement and type of the components may be made without departing from the spirit or scope of the various embodiments.

In at least one embodiment, cloud network 102 enables one or more network services for a user based on the operation of corresponding arrangements 104 and 106 of virtually any type of networked computing device. As shown, the networked computing devices may include network devices 112 and 114, enclosure of blade servers 110, enclosure of server computers 116, super computer network device 118, and the like. Although not shown, one or more mobile devices may be included in cloud network 102 in one or more arrangements to provide one or more network services to a user. Also, these arrangements of networked computing devices may or may not be mutually exclusive of each other.

In at least one of the various embodiments, network devices 112 and 114 may include module, processes, components, services, or the like, and which are operative to perform as a Network Monitor Device (NMD). These NMDs are arranged to monitor and record flows of packets in a session that are communicated between at least two endpoints over at least one network. These NMDs can provide information for assessing different aspects of these monitored flows. In at least one embodiment, the NMDs passively monitor network packet traffic without participating in the communication protocols. Both network devices 112 and 114 are arranged to operate as NMDs that may perform actions as further described in conjunction with at least the figures beginning at FIG. 6.

Also, in at least one of the various embodiments, enclosure of blade servers 110, enclosure of enclosure of server computers 116, super computer network device 118 may include network devices that perform the actions of cloud code server device 112 and cloud platform server device 114. In at least one embodiment, at least one blade server or at least one server computer may be arranged to also operate as an NMD.

Additionally, the user may employ a plurality of virtually any type of wired or wireless networked computing devices to communicate with cloud network 102 and access at least one of the network services enabled by one or more of arrangements 104 and 106. These networked computing devices may include tablet client device 122, handheld client device 124, wearable client device 126, desktop client device 120, and the like. Although not shown, in various embodiments, the user may also employ notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), televisions, integrated devices combining at least one of the preceding devices, and the like.

One embodiment of a client device is described in more detail below in conjunction with FIG. 3. Generally, client devices may include virtually any substantially portable networked computing device capable of communicating over a wired, wireless, or some combination of wired and wireless network.

In various embodiments, network 102 may employ virtually any form of communication technology and topology. For example, network 102 can include local area networks Personal Area Networks (PANs), (LANs), Campus Area Networks (CANs), Metropolitan Area Networks (MANs) Wide Area Networks (WANs), direct communication connections, and the like, or any combination thereof. On an interconnected set of LANs, including those based on differing architectures and protocols, a router acts as a link between LANs, enabling messages to be sent from one to another. In addition, communication links within networks may include virtually any type of link, e.g., twisted wire pair lines, optical fibers, open air lasers or coaxial cable, plain old telephone service (POTS), wave guides, acoustic, full or fractional dedicated digital communication lines including T1, T2, T3, and T4, and/or other carrier and other wired media and wireless media. These carrier mechanisms may include E-carriers, Integrated Services Digital Networks (ISDNs), universal serial bus (USB) ports, Firewire ports, Thunderbolt ports, Digital Subscriber Lines (DSLs), wireless links including satellite links, or other communications links known to those skilled in the art. Moreover, these communication links may further employ any of a variety of digital signaling technologies, including without limit, for example, DS-0, DS-1, DS-2, DS-3, DS-4, OC-3, OC-12, OC-48, or the like. Furthermore, remotely located computing devices could be remotely connected to networks via a modem and a temporary communication link. In essence, network 102 may include virtually any communication technology by which information may travel between computing devices. Additionally, in the various embodiments, the communicated information may include virtually any kind of information including, but not limited to processor-readable instructions, data structures, program modules, applications, raw data, control data, archived data, video data, voice data, image data, text data, and the like.

Network 102 may be partially or entirely embodied by one or more wireless networks. A wireless network may include any of a variety of wireless sub-networks that may further overlay stand-alone ad-hoc networks, and the like. Such sub-networks may include mesh networks, Wireless LAN (WLAN) networks, Wireless Router (WR) mesh, cellular networks, pico networks, PANs, Open Air Laser networks, Microwave networks, and the like. Network 102 may further include an autonomous system of intermediate network devices such as terminals, gateways, routers, switches, firewalls, load balancers, and the like, which are coupled to wired and/or wireless communication links. These autonomous devices may be operable to move freely and randomly and organize themselves arbitrarily, such that the topology of network 102 may change rapidly.

Network 102 may further employ a plurality of wired and wireless access technologies, e.g., 2nd (2G), 3rd (3G), 4th (4G), $5^{th}$ (5G), $6^{th}$ (6G), generation wireless access technologies, and the like, for mobile devices. These wired and wireless access technologies may also include Global System for Mobile communication (GSM), General Packet Radio Services (GPRS), Enhanced Data GSM Environment (EDGE), Code Division Multiple Access (CDMA), Wideband Code Division Multiple Access (WCDMA), Long Term Evolution Advanced (LTE), Universal Mobile Telecommunications System (UMTS), Orthogonal frequency-division multiplexing (OFDM), Wideband Code Division Multiple Access (W-CDMA), Code Division Multiple Access 2000 (CDMA2000), Evolution-Data Optimized (EV-DO), High-Speed Downlink Packet Access (HSDPA), IEEE 802.16 Worldwide Interoperability for Microwave Access (WiMax), ultra wide band (UWB), user datagram protocol (UDP), transmission control protocol/Internet protocol (TCP/IP), any portion of the Open Systems Interconnection (OSI) model protocols, Short Message Service (SMS), Multimedia Messaging Service (MMS), Web Access Protocol (WAP), Session Initiation Protocol/Real-time Transport Protocol (SIP/RTP), or any of a variety of other wireless or wired communication protocols. In one non-limiting example, network 102 may enable a mobile device to wirelessly access a network service through a combination of several radio network access technologies such as GSM, EDGE, HSDPA, LTE and the like.

Enclosure of Blade Servers

Figure 2A:
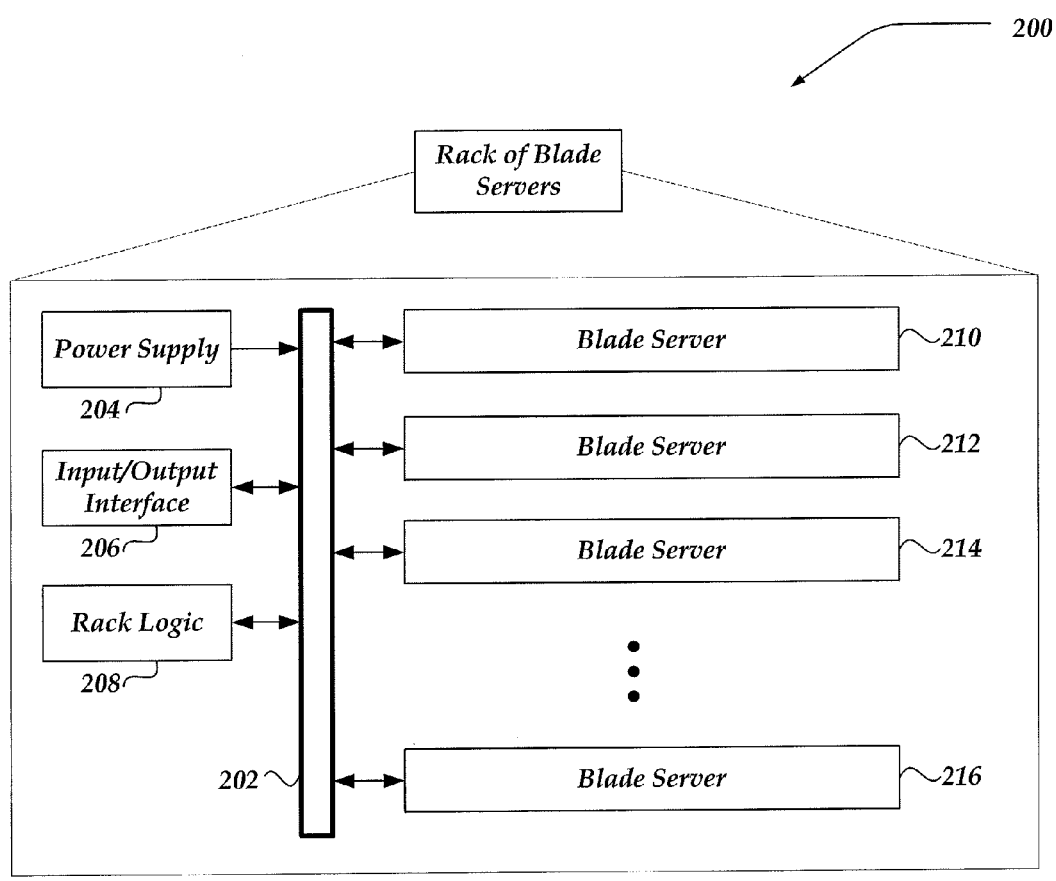
FIG. 2A shows a schematic drawing of a rack of blade servers.

FIG. 2A shows one embodiment of an enclosure of blade servers 200, which are also illustrated in FIG. 1. Enclosure of blade servers 200 may include many more or fewer components than those shown in FIG. 2A. However, the components shown are sufficient to disclose an illustrative embodiment. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that may have at least one network connection and a power cord connection. Each server computer often includes redundant components for power and interfaces.

As shown in the figure, enclosure 200 contains power supply 204, and input/output interface 206, rack logic 208, several blade servers 210, 212, 214, and 216, and blade server interconnect 202. Power supply 204 provides power to each component and blade server within the enclosure. The input/output interface 206 provides internal and external communication for components and blade servers within the enclosure. Backplane 208 can enable passive and active communication of power, logic, input signals, and output signals for each blade server.

Illustrative Blade Server

Figure 2B:
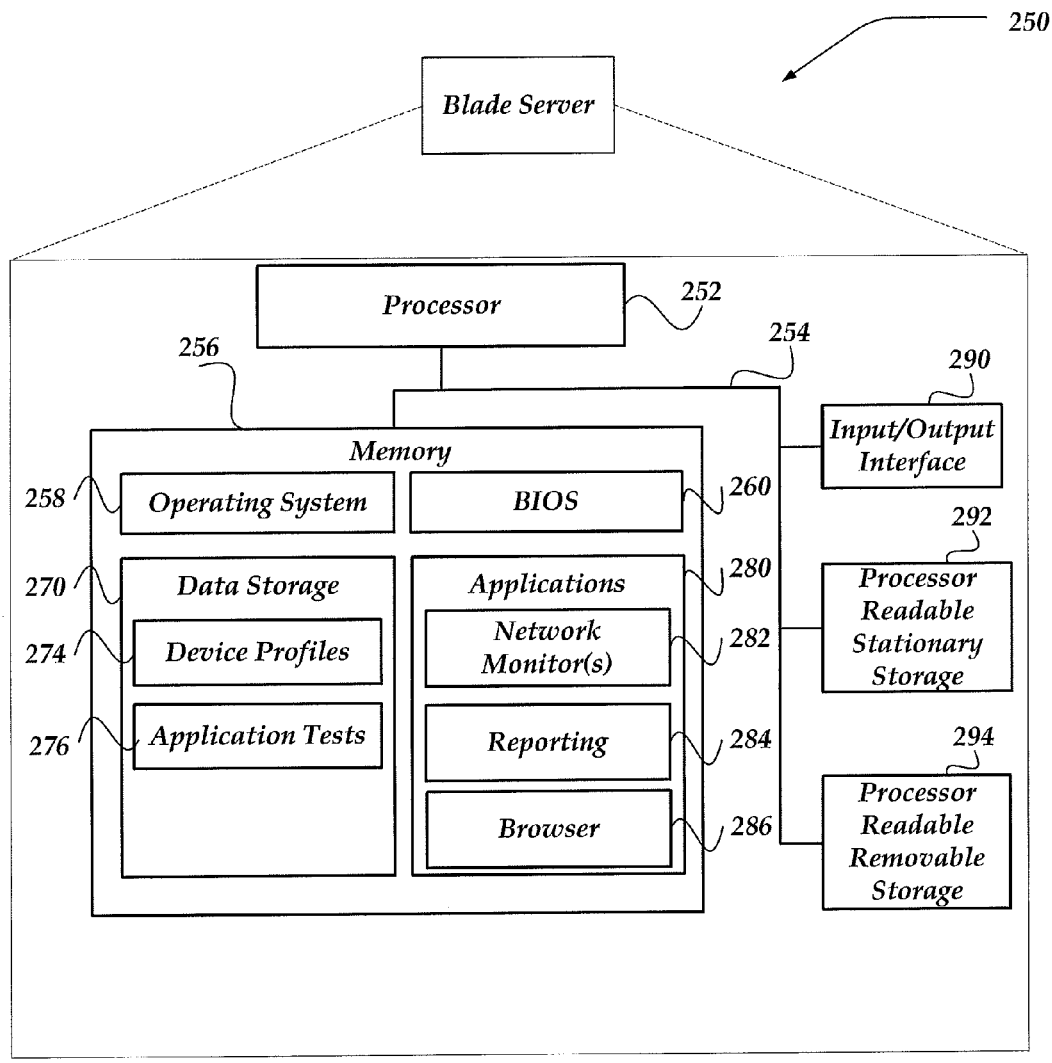
FIG. 2B illustrates a schematic embodiment of a blade server that may be included in a rack of blade servers such as that shown in FIG. 2A.

FIG. 2B illustrates an illustrative embodiment of blade server 250, which may include many more or fewer components than those shown. As shown in FIG. 2A, a plurality of blade servers may be included in one enclosure that shares resources provided by the enclosure to reduce size, power, and cost.

Blade server 250 includes processor 252 which communicates with memory 256 via bus 254. Blade server 250 also includes input/output interface 290, processor-readable stationary storage device 292, and processor-readable removable storage device 294. Input/output interface 290 can enable blade server 250 to communicate with other blade servers, mobile devices, network devices, and the like. Interface 290 may provide wireless and/or wired communication links for blade server. Processor-readable stationary storage device 292 may include one or more devices such as an electromagnetic storage device (hard disk), solid state hard disk (SSD), hybrid of both an SSD and a hard disk, and the like. In some configurations, a blade server may include multiple storage devices. Also, processor-readable removable storage device 294 enables processor 252 to read non-transitory storage media for storing and accessing processor-readable instructions, modules, data structures, and other forms of data. The non-transitory storage media may include Flash drives, tape media, floppy media, and the like.

Memory 256 may include Random Access Memory (RAM), Read-Only Memory (ROM), hybrid of RAM and ROM, and the like. As shown, memory 256 includes operating system 258 and basic input/output system (BIOS) 260 for enabling the operation of blade server 250. In various embodiments, a general-purpose operating system may be employed such as a version of UNIX, LINUX™, a specialized server operating system such as Microsoft's Windows Server™, or the like.

Memory 256 further includes one or more data storage 270, which can be utilized by blade server 250 to store, among other things, applications 280 and/or other data. Data store 270 may include program code, data, algorithms, and the like, for use by processor 252 to execute and perform actions such as those described in conjunction with FIGS. 5-9. In one embodiment, at least some of datastore 270 might also be stored on another component of blade server 250, including, but not limited to, processor-readable removable storage device 294, processor-readable stationary storage device 292, or any other non-transitory processor-readable storage device (not shown). Data storage 270 may include, for example, Device Profiles 274, Application Tests 276, or the like. Device Profiles 274 is arranged to store device profile data for network devices that may be discovered on the network, as well as other supporting data. Likewise, Application Test 276 may contain one or more tests for discovering applications, application dependencies, operating systems, devices, and other supporting data, arranged in lists, databases, configuration files, or the like.

Applications 280 may include processor executable instructions which, when executed by blade server 250, transmit, receive, and/or otherwise process messages, audio, video, and enable communication with other networked computing devices. Examples of application programs include database servers, file servers, calendars, transcoders, and so forth. Applications 280 may include, for example, Network Monitor(s) 282, Reporting application 284, and Browser 286, which may be enabled to perform actions further described below starting with at least FIG. 6.

Human interface components (not pictured), may be remotely associated with blade server 250, which can enable remote input to and/or output from blade server 250. For example, information to a display or from a keyboard can be routed through the input/output interface 290 to appropriate peripheral human interface components that are remotely located. Examples of peripheral human interface components include, but are not limited to, an audio interface, a display, keypad, pointing device, touch interface, and the like.

Furthermore, in at least one of the various embodiments, network monitor application 282, and reporting application 284 may be operative in a cloud-based computing environment. In at least one of the various embodiments, these applications, and others, may be executing within virtual machines and/or virtual servers that may be managed in a cloud-based based computing environment. In at least one of the various embodiments, in this context the applications may flow from one physical blade server and/or network device within the cloud-based environment to another depending on performance and scaling considerations automatically managed by the cloud computing environment. Likewise, in at least one of the various embodiments, virtual machines and/or virtual servers dedicated to running network monitor application 282 and reporting application 284 may be provisioned and de-commissioned automatically.

Also, in at least one of the various embodiments, Device Profiles 274 and Application Tests 276, or the like, may be located on virtual servers running in a cloud-based computing environment rather than being tied to one or more specific physical blade servers.

Illustrative Client Device

Figure 3:
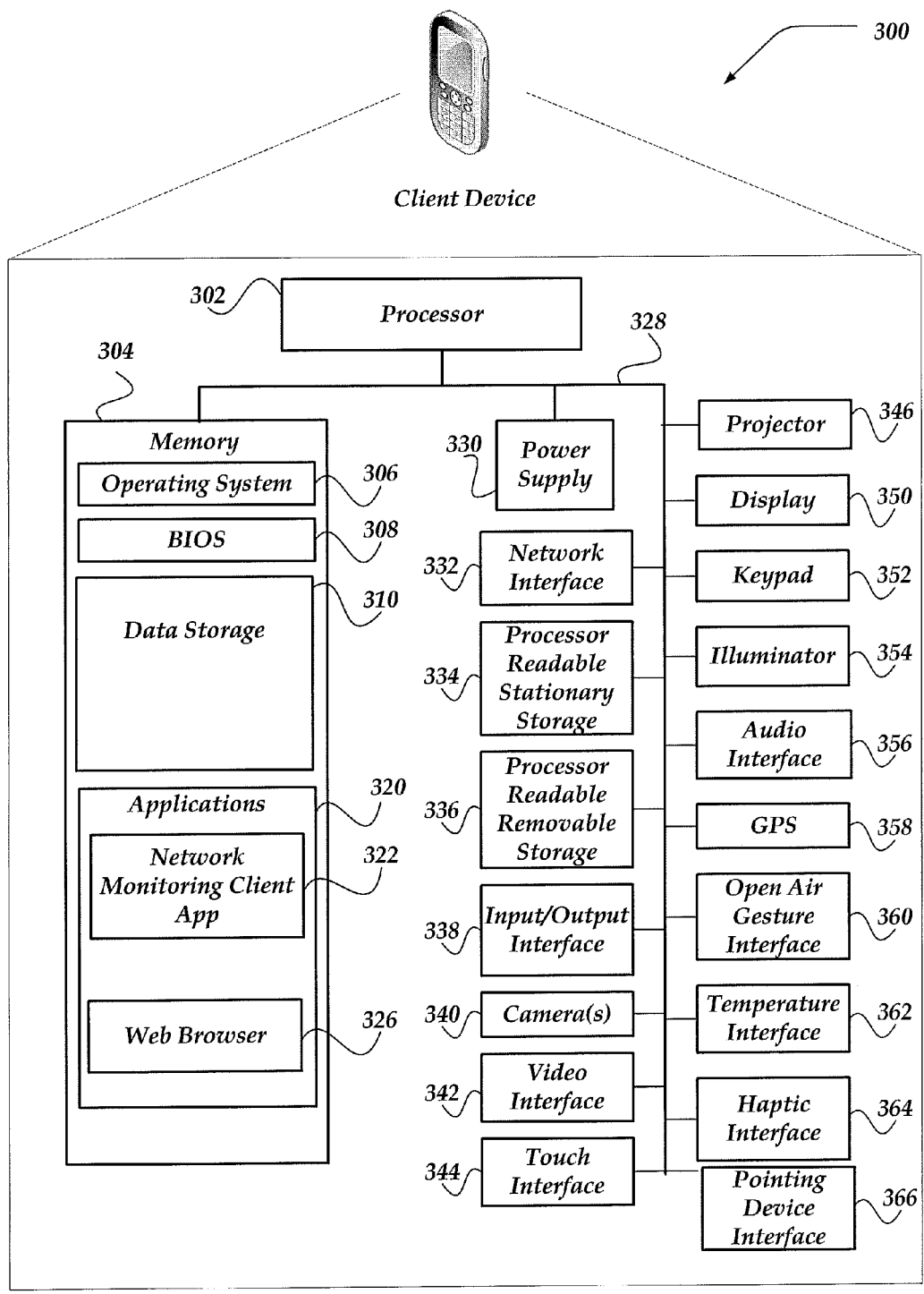
FIG. 3 shows a schematic embodiment of a client device.

FIG. 3 shows one embodiment of client device 300 that may include many more or less components than those shown. Client device 300 may represent, for example, at least one embodiment of client devices shown in FIG. 1.

Client device 300 may include processor 302 in communication with memory 304 via bus 328. Client device 300 may also include power supply 330, network interface 332, audio interface 356, display 350, keypad 352, illuminator 354, video interface 342, input/output interface 338, haptic interface 364, global positioning systems (GPS) receiver 358, open air gesture interface 360, temperature interface 362, camera(s) 340, projector 346, pointing device interface 366, processor-readable stationary storage device 334, and processor-readable removable storage device 336. Client device 300 may optionally communicate with a base station (not shown), or directly with another computing device. And in one embodiment, although not shown, a gyroscope may be employed within client device 300 to measuring and/or maintaining an orientation of client device 300.

Power supply 330 may provide power to client device 300. A rechargeable or non-rechargeable battery may be used to provide power. The power may also be provided by an external power source, such as an AC adapter or a powered docking cradle that supplements and/or recharges the battery.

Network interface 332 includes circuitry for coupling client device 300 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 332 is sometimes known as a transceiver, transceiving device, or network interface card (NIC).

Audio interface 356 may be arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of client device 300, e.g., using voice recognition, detecting touch based on sound, and the like.

Display 350 may be a liquid crystal display (LCD), gas plasma, electronic ink, light emitting diode (LED), Organic LED (OLED) or any other type of light reflective or light transmissive display that can be used with a computing device. Display 350 may also include a touch interface 344 arranged to receive input from an object such as a stylus or a digit from a human hand, and may use resistive, capacitive, surface acoustic wave (SAW), infrared, radar, or other technologies to sense touch and/or gestures.

Projector 346 may be a remote handheld projector or an integrated projector that is capable of projecting an image on a remote wall or any other reflective object such as a remote screen.

Video interface 342 may be arranged to capture video images, such as a still photo, a video segment, an infrared video, or the like. For example, video interface 342 may be coupled to a digital video camera, a web-camera, or the like. Video interface 342 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 352 may comprise any input device arranged to receive input from a user. For example, keypad 352 may include a push button numeric dial, or a keyboard. Keypad 352 may also include command buttons that are associated with selecting and sending images.

Illuminator 354 may provide a status indication and/or provide light. Illuminator 354 may remain active for specific periods of time or in response to events. For example, when illuminator 354 is active, it may backlight the buttons on keypad 352 and stay on while the client device is powered. Also, illuminator 354 may backlight these buttons in various patterns when particular actions are performed, such as dialing another client device. Illuminator 354 may also cause light sources positioned within a transparent or translucent case of the client device to illuminate in response to actions.

Client device 300 may also comprise input/output interface 338 for communicating with external peripheral devices or other computing devices such as other client devices and network devices. The peripheral devices may include an audio headset, display screen glasses, remote speaker system, remote speaker and microphone system, and the like. Input/output interface 338 can utilize one or more technologies, such as Universal Serial Bus (USB), Infrared, WiFi, WiMax, Bluetooth™, and the like.

Haptic interface 364 may be arranged to provide tactile feedback to a user of the client device. For example, the haptic interface 364 may be employed to vibrate client device 300 in a particular way when another user of a computing device is calling. Temperature interface 362 may be used to provide a temperature measurement input and/or a temperature changing output to a user of client device 300. Open air gesture interface 360 may sense physical gestures of a user of client device 300, for example, by using single or stereo video cameras, radar, a gyroscopic sensor inside a device held or worn by the user, or the like. Camera 340 may be used to track physical eye movements of a user of client device 300.

GPS transceiver 358 can determine the physical coordinates of client device 300 on the surface of the Earth, which typically outputs a location as latitude and longitude values. GPS transceiver 358 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 300 on the surface of the Earth. It is understood that under different conditions, GPS transceiver 358 can determine a physical location for client device 300. In at least one embodiment, however, client device 300 may, through other components, provide other information that may be employed to determine a physical location of the device, including for example, a Media Access Control (MAC) address, IP address, and the like.

Human interface components can be peripheral devices that are physically separate from client device 300, allowing for remote input and/or output to client device 300. For example, information routed as described here through human interface components such as display 350 or keyboard 352 can instead be routed through network interface 332 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client device with such peripheral human interface components is a wearable computing device, which might include a remote pico projector along with one or more cameras that remotely communicate with a separately located client device to sense a user's gestures toward portions of an image projected by the pico projector onto a reflected surface such as a wall or the user's hand.

A client device may include a browser application that is configured to receive and to send web pages, web-based messages, graphics, text, multimedia, and the like. The client device's browser application may employ virtually any programming language, including a wireless application protocol messages (WAP), and the like. In at least one embodiment, the browser application is enabled to employ Handheld Device Markup Language (HDML), Wireless Markup Language (WML), WML Script, JavaScript, Standard Generalized Markup Language (SGML), HyperText Markup Language (HTML), eXtensible Markup Language (XML), HTML5, and the like.

Memory 304 may include RAM, ROM, and/or other types of memory. Memory 304 illustrates an example of computer-readable storage media (devices) for storage of information such as computer-readable instructions, data structures, program modules or other data. Memory 304 may store BIOS 308 for controlling low-level operation of client device 300. The memory may also store operating system 306 for controlling the operation of client device 300. It will be appreciated that this component may include a general-purpose operating system such as a version of UNIX, or Linux™, or a specialized mobile computer communication operating system such as Windows Phone™, or the Symbian® operating system. The operating system may include, or interface with a Java virtual machine module that enables control of hardware components and/or operating system operations via Java application programs.

Memory 304 may further include one or more data storage 310, which can be utilized by client device 300 to store, among other things, applications 320 and/or other data. For example, data storage 310 may also be employed to store information that describes various capabilities of client device 300. The information may then be provided to another device based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions. In one embodiment, at least some of data storage 310 might also be stored on another component of client device 300, including, but not limited to, non-transitory processor-readable removable storage device 336, processor-readable stationary storage device 334, or even external to the client device.

Applications 320 may include computer executable instructions which, when executed by mobile device 300, transmit, receive, and/or otherwise process instructions and data. Applications 320 may include, for example, network monitoring client application 322. In at least one of the various embodiments, network monitoring application 322, and browser application 326 may be used to communicate with blade servers 110, server computers 116 and/or Supercomputer 118, and/or network device 112 or network device 114, including, but not limited to, queries, searches, API calls, content, data, messages, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Device

Figure 4:
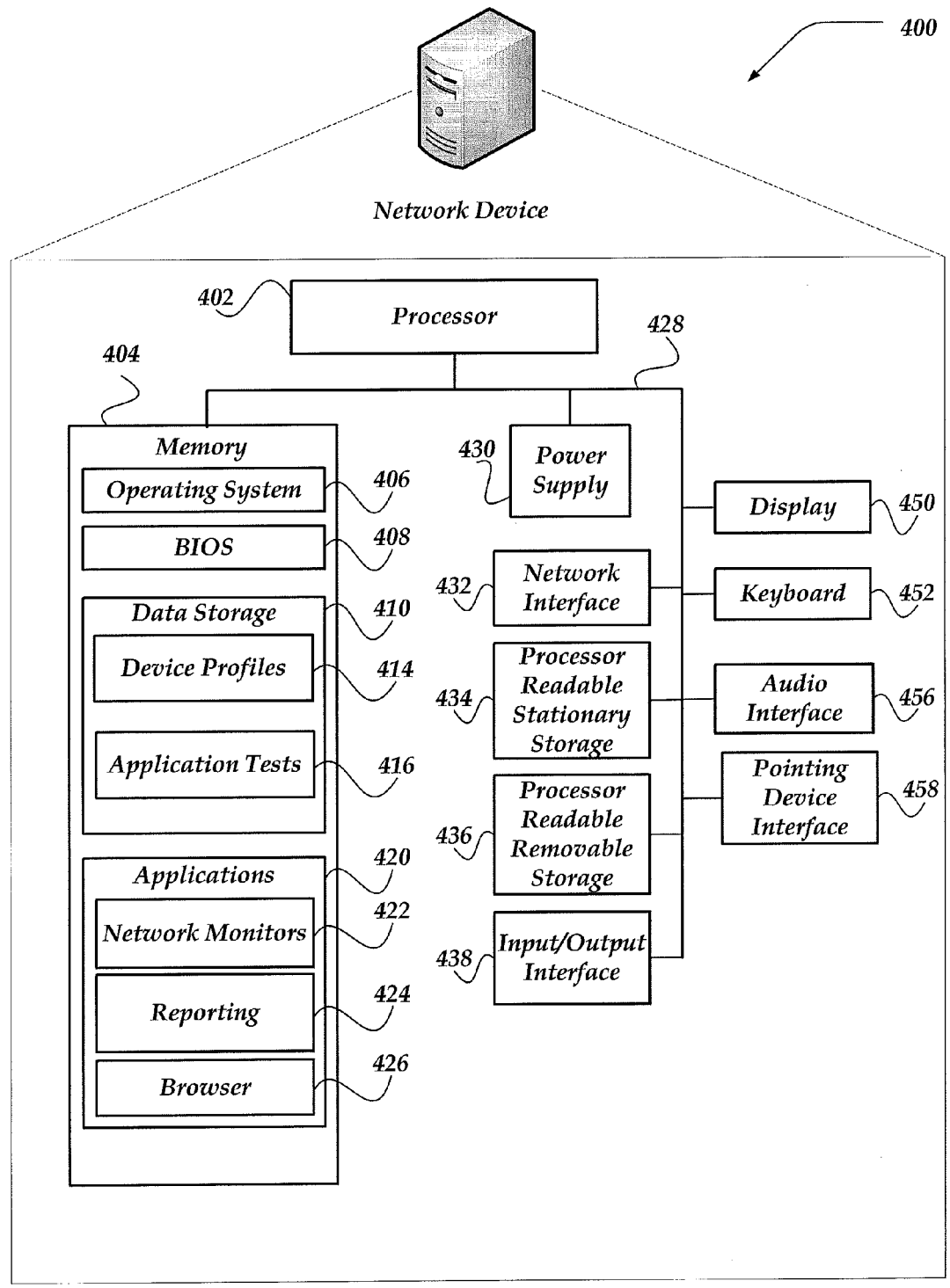
FIG. 4 illustrates a schematic embodiment of a network device.

FIG. 4 shows one embodiment of network device 400 that may be included in a system implementing the invention. Network device 400 may include many more or less components than those shown in FIG. 4. However, the components shown are sufficient to disclose an illustrative embodiment for practicing these innovations. Network device 400 may represent, for example, one embodiment of at least one of network device 112, 114, or 120 of FIG. 1.

As shown in the figure, network device 400 includes a processor 402 in communication with a memory 404 via a bus 428. Network device 400 also includes a power supply 430, network interface 432, audio interface 456, display 450, keyboard 452, input/output interface 438, processor-readable stationary storage device 434, and processor-readable removable storage device 436. Power supply 430 provides power to network device 400.

Network interface 432 includes circuitry for coupling network device 400 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 432 is sometimes known as a transceiver, transceiving device, or network interface card (NIC). Network device 400 may optionally communicate with a base station (not shown), or directly with another computing device.

Audio interface 456 is arranged to produce and receive audio signals such as the sound of a human voice. For example, audio interface 456 may be coupled to a speaker and microphone (not shown) to enable telecommunication with others and/or generate an audio acknowledgement for some action. A microphone in audio interface 456 can also be used for input to or control of network device 400, for example, using voice recognition.

Display 450 may be a liquid crystal display (LCD), gas plasma, electronic ink, light emitting diode (LED), Organic LED (OLED) or any other type of light reflective or light transmissive display that can be used with a computing device. Display 450 may be a handheld projector or pico projector capable of projecting an image on a wall or other object.

Network device 400 may also comprise input/output interface 438 for communicating with external devices not shown in FIG. 4. Input/output interface 438 can utilize one or more wired or wireless communication technologies, such as USB™, Firewire™, WiFi, WiMax, Thunderbolt™, Infrared, Bluetooth™, Zigbee™, serial port, parallel port, and the like.

Human interface components can be physically separate from network device 400, allowing for remote input and/or output to network device 400. For example, information routed as described here through human interface components such as display 450 or keyboard 452 can instead be routed through the network interface 432 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 458 to receive user input.

Memory 404 may include Random Access Memory (RAM), Read-Only Memory (ROM), and/or other types of memory. Memory 404 illustrates an example of computer-readable storage media (devices) for storage of information such as computer-readable instructions, data structures, program modules or other data. Memory 404 stores a basic input/output system (BIOS) 408 for controlling low-level operation of network device 400. The memory also stores an operating system 406 for controlling the operation of network device 400. It will be appreciated that this component may include a general-purpose operating system such as a version of UNIX, or Linux™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs.

Memory 404 may further include one or more data storage 410, which can be utilized by network device 400 to store, among other things, applications 420 and/or other data. For example, data storage 410 may also be employed to store information that describes various capabilities of network device 400. The information may then be provided to another device based on any of a variety of events, including being sent as part of a header during a communication, sent upon request, or the like. Data storage 410 may also be employed to store social networking information including address books, buddy lists, aliases, user profile information, or the like. Data storage 410 may further include program code, data, algorithms, and the like, for use by a processor, such as processor 402 to execute and perform actions such as those action describe in conjunction with FIGS. 5-9. In one embodiment, at least some of data storage 410 might also be stored on another component of network device 400, including, but not limited to, non-transitory media inside processor-readable removable storage device 436, processor-readable stationary storage device 434, or any other computer-readable storage device within network device 400, or even external to network device 400. Data storage 410 may include, for example, Device Profiles 414, and Application Tests 416.

Applications 420 may include computer executable instructions which, when executed by network device 400, transmit, receive, and/or otherwise process messages (e.g., SMS, Multimedia Messaging Service (MMS), Instant Message (IM), email, and/or other messages), audio, video, and enable telecommunication with another user of another mobile device. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 420 may include Network Monitor application 422, Reporting application 424, and Browser application 426 which may be enabled to perform actions further described below starting with at least FIG. 6. In at least one of the various embodiments, while they may be illustrated here as separate applications, Network Monitor application 422 and/or Reporting application 424 may be implemented as modules and/or components of the same application. Further, in at least one of the various embodiments, Network Monitor application 422 and/or Reporting application 424 may be implemented as operating system extensions, modules, plugins, or the like.

Furthermore, in at least one of the various embodiments, Network Monitor application 422 and Reporting application 424 may be operative in a cloud-based computing environment. In at least one of the various embodiments, these applications, and others, that comprise the mobile development platform may be executing within virtual machines and/or virtual servers that may be managed in a cloud-based based computing environment. In at least one of the various embodiments, in this context the applications may flow from one physical network device within the cloud-based environment to another depending on performance and scaling considerations automatically managed by the cloud computing environment. Likewise, in at least one of the various embodiments, virtual machines and/or virtual servers dedicated to running Network Monitor application 422 and/or Reporting application 424 may be provisioned and de-commissioned automatically.

Also, in at least one of the various embodiments, Device Profiles 414 and Application Tests 416, or the like, may located in virtual servers running in a cloud-based computing environment rather than being tied to one or more specific physical blade servers or server computer devices.

Illustrative Passive Network Monitor Device

Figure 5:
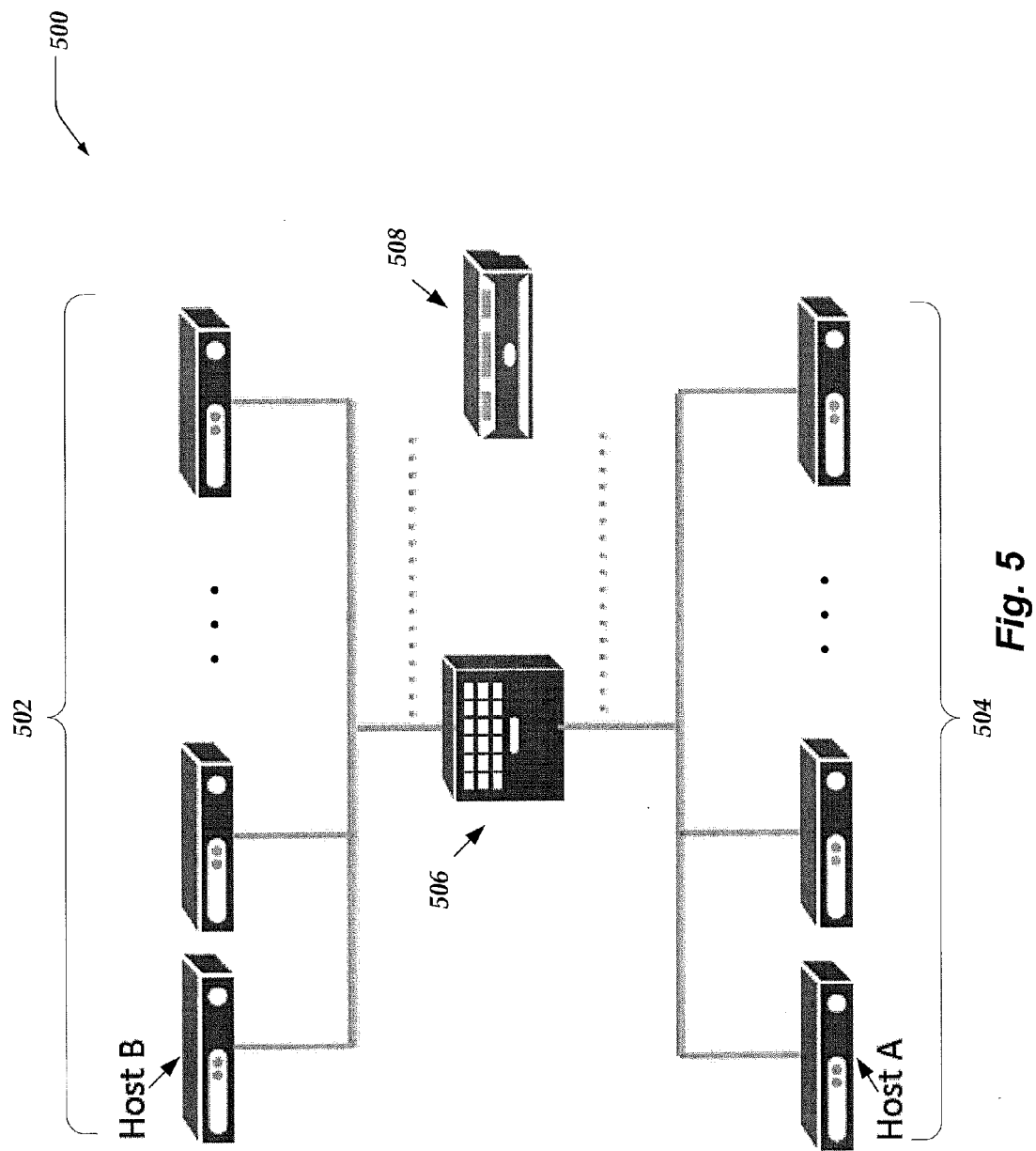
FIG. 5 illustrates a portion of a logical architecture for automated passive application discovery in accordance with at least one of the various embodiments.

FIG. 5 shows one embodiment of system 500 that includes a plurality of network devices on first network 502 and a plurality of network devices on second network 504. Communication between the first network and the second network is managed by switch 506. Also, NMD 508 is arranged to passively monitor and record packets that are communicated in flows between a network device on first network 502 and second network 504. For example, the communication of flows of packets between the Host B network device and the Host A network device are managed by switch 506 and network device 508 is operative to passively monitor and record these flows.

NMD 508 can receive network communication for monitoring through a variety of means including network taps, wireless receivers, port mirrors or directed tunnels from network switches, servers including the endpoints themselves, or other infrastructure devices. In at least some of the various embodiments, the NMD may receive a copy of each packet on a particular network segment or virtual local area network (VLAN). Also, for at least some of the various embodiments, they may receive these packet copies through a port mirror on a managed Ethernet switch, e.g., a Switched Port Analyzer (SPAN) port, or a Roving Analysis Port (RAP). Port mirroring enables analysis and debugging of network communications. Port mirroring can be performed for inbound or outbound traffic (or both) on single or multiple interfaces.

General Operation

FIGS. 6-9 represent the generalized operations of automatic passive discovery of applications in accordance with at least one of the various embodiments. In at least one of the various embodiments, processes 600, 700, 800, and 900 described in conjunction with FIGS. 6-9 may be implemented by and/or executed on a single network device, such as network device 400 of FIG. 4. In other embodiments, these processes or portions of process thereof may be implemented by and/or executed on a plurality of network devices, such as network device 400 of FIG. 4. In yet other embodiments, these processes or portions thereof may be implemented by and/or executed on one or more blade servers, such as blade server 250 of FIG. 2B. However, embodiments are not so limited, and various combinations of network devices, blade servers, or the like may be utilized. Further, in at least one of the various embodiments, the processes described in conjunction with FIGS. 6-9 may be operative in automated passive discovery architectures such as those described in conjunction with FIG. 5.

Figure 6:
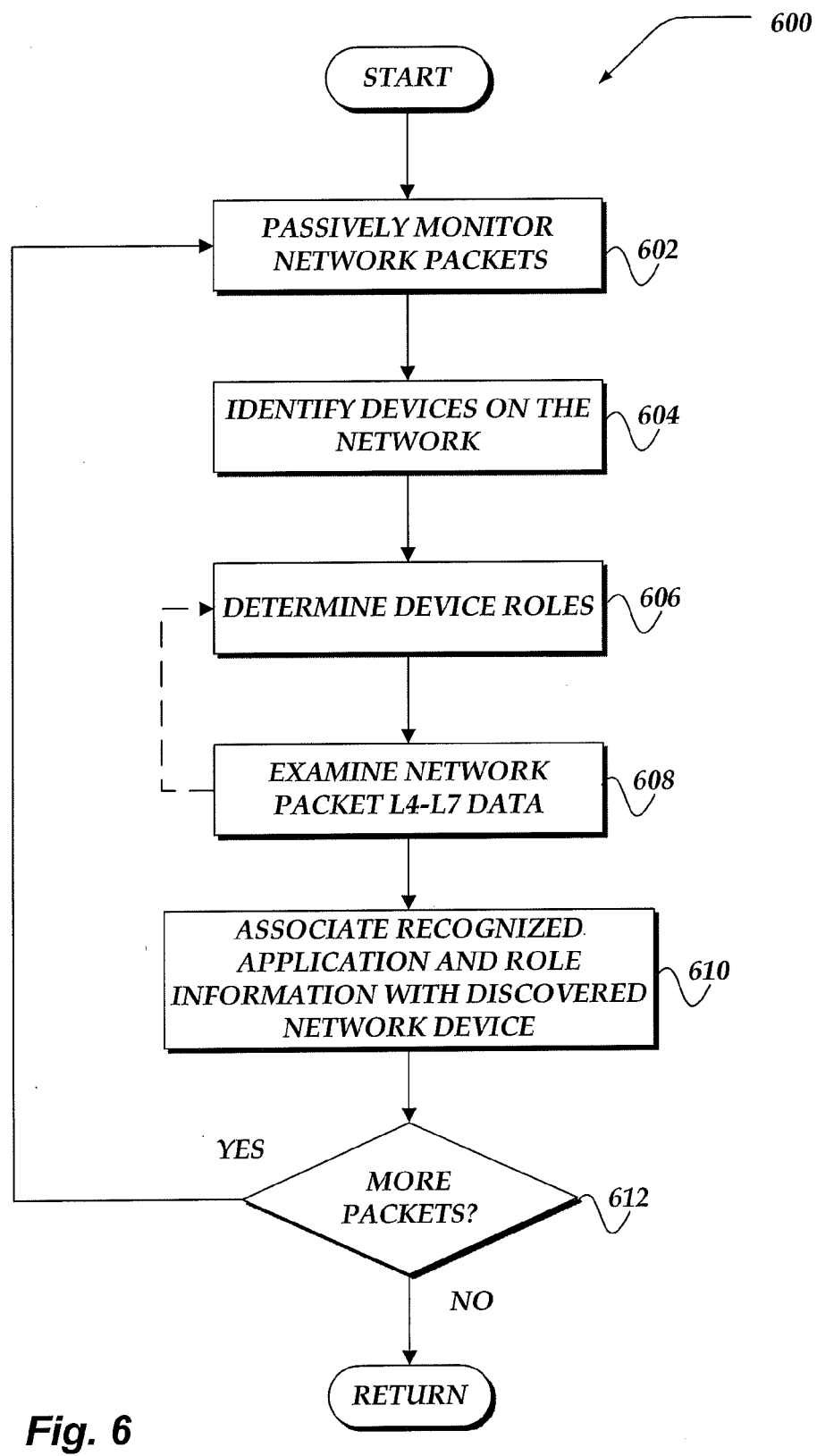
FIG. 6 shows an overview flowchart for a process for automated passive discovery of applications in accordance with at least one of the various embodiments.

FIG. 6 shows an overview flowchart for process 600 for automated passive discovery of applications in accordance with at least one of the various embodiments. After a start block, at block 602, in at least one of the various embodiments, the NMD may passively monitor network packets that may transmitted over the network. In at least one of the various embodiments, the NMD may be enabled to employ various techniques for passively monitoring network packets that may be flowing on the network, including, SPAN ports, mirror ports, network taps, or the like, provided by one or more routers, switches, network devices, or the like that may be operative on the monitored networks.

At block 604, in at least one of the various embodiments, network devices that may be on the network may be identified based on network packets the NMD may capture. In at least one of the various embodiments, the NMD may be enabled to perform various techniques to identify network devices that are operative on the monitored networks.

In at least one of the various embodiments, the NMD may detect devices if they emit any network packets onto the network that may be observed by the NMD. In at least one of the various embodiments, network packet emission may occur during the course of normal network communication between and among one or more devices on the network. In at least one of the various embodiments, the NMD may be a non-participant in the ongoing network communication among and/or between the devices that may emit the capture/monitored network packets. In at least one of the various embodiments, the NMD may passively capture the network packets without interfering and/or participating in the communication.

In at least one of the various embodiments, the NMD may perform active tests and/or probes of the monitored networks. In some embodiments, one or more active tests may be triggered based on the results from passive discovery techniques. For example, in at least one of the various embodiments, an NMD may be arranged and/or configured to confirm the existence of one or more discovered devices by actively contacting them (e.g., pinging the discovered device, or the like). In at least one of the various embodiments, the NMD may determine if and how to actively probe devices based on one or more defined rule based policies.

In some embodiments, some network packets may be one or more various forms of "device advertisements" that may be intended to provide a manifest of available services to other systems on the network—generally systems other than the NMD. For example, in some embodiments, such device advertisements may include, Cisco Discovery Protocol (CDP), Simple Service Discovery Protocol (SSDP), Router Advertisement, Gratuitous ARPs, or the like.

In at least one of the various embodiments, the detection of an emitted network packet may be considered proof-positive of the existence of a given device on the network. In contrast, in some embodiments, the receipt of a network packet may not provide verifiable proof of the existence of a device solely by external observation.

In at least one of the various embodiments, network packets may contain framing headers that include a source and destination hardware identifier, such as, a MAC address. In at least one of the various embodiments, the NMD may use the source MAC address to uniquely identify the network packet emitting entity on the network.

In at least one of the various embodiments, an exception to the emission-only rule may be made for certain entities which advertise a MAC address that may not match their physical hardware address. For example, devices such as virtual routers, employing protocols such as, Virtual Router Redundancy Protocol (VRRP), Common Address Redundancy Protocol (CARP), Hot Standby Router Protocol (HSRP), or the like, may be discovered upon observing network traffic seen heading to that destination. In at least one of the various embodiments, the MAC addresses observed by the NMD may be employed by the NMD to disambiguate devices at the data-link layer (e.g., OSI Layer 2).

In some embodiments, it may be desirable to disambiguate devices at the network layer (OSI Layer 3 aka L3) In at least one of the various embodiments, L3 disambiguation cannot simply count L3 network address, such as, IP addresses, because the various tap points on an internet-facing connection may be exposed to billions of network layer addresses. Thus, in at least one of the various embodiments, it may be desirable to identify the one or more subsets of L3 addresses that may be of interest, such as address that one local to monitored networks, or the like. In at least one of the various embodiments, the NMD may be configured using mask, filters, or the like, as part of identifying the one or more subsets of L3 address that may be of interest.

In at least one of the various embodiments, the NMD may be arranged to employ one or more L2-to-L3 (OSI Layers) mapping processes for identifying L3 addresses of interest. Since L2 protocols may be present on the local L2 broadcast domain, or subnets, the NMD may identify network packets that may include header information that may be used for mapping the L2 address with a L3 address. In at least one of the various embodiments, if the L3 address may be mapped to a L2 address, the NMD may determine that it is monitoring network packets from a local L3 address. For example, Address Resolution Protocol (ARP) is a protocol that specifies L2-to-L3 address mapping. Thus, if an ARP packet may be observed by the NMD on a local network, the NMD may examine the ARP network packet to determine a mapping of L3 addresses to the underlying L2 device. Given that ARP network packets cannot be routed across broadcast domains (e.g., beyond a sub-net), a non-proxied ARP request observed on a local network for an L3 address may indicate that the L3 address may be considered local by the requestor. Thus, the NMD may rely on this property of the ARP protocol to establish the L2-to-L3 mapping. Other protocols may also be exploited to determine L2-to-L3 address mapping information, for example, IPv6 provides the Neighbor Discovery Protocol (NDP). Accordingly, in at least one of the various embodiments, the NMD may examine captured NDP network packets to determine L2-to-L3 address mappings, as well.

In at least one of the various embodiments, network device address mapping may be stored using, data storage 270, data storage 410, a database, or the like. In at least one of the various embodiments, the device-address mapping data, as well as, the device discovery data may be stored using data storage techniques that enable the NMD to access the data using various searches and queries for use in application discovery, application dependency discovery, operating system discovery, or the like, or combination thereof.

At block 606, in at least one of the various embodiments, one or more roles for the discovered devices may be determined based on the monitored network packets. In at least one of the various embodiments, in addition to employing the observed network packets to identify devices on the monitored networks, the NMD may analyze the network packets to determine one or more roles that the discovered devices may perform.

In at least one of the various embodiments, roles determined by the NMD may include, web server, database, router, switch, directory server, network attached storage (NAS), printer, or the like, or combination thereof. In at least one of the various embodiments, the NMD may be arranged to perform various passive analysis techniques for determining the roles that may be associated with a discovered device.

In at least one of the various embodiments, the NMD may identify the hardware device vendor for a discovered device based on the top-24 bits of the discovered device's MAC address. In at least one of the various embodiments, this portion of the MAC address is the Organizationally Unique Identifier (OUI) for the discovered device. OUI is an industry standard that may be relied upon to identify the vendor information for a discovered device. In at least one of the various embodiments, the NMD may be arranged to employ the OUI to lookup the vendor of the discovered device. The vendor information may be used by the NMD as part of determining the role of the discovered device. In at least one of the various embodiments, the NMD may use one or more well-known techniques to query a local or remote service/process that may provide the vendor information that corresponds to an OUI.

In at least one of the various embodiments, the NMD may examine captured network packets for dedicated discovery protocols, such as Cisco Discovery Protocol (CDP), Link Layer Discovery Protocol (LLDP), or the like, to determine additional details about the discovered devices. Thus, in at least one of the various embodiments, the NMD may include processes and/or modules that may be arranged to recognize and examine the contents of one or more well-known discovery protocols. Each discovery protocol may have well-known and/or determinable formats and content values that may be exploited by the NMD to facilitate the identification of one or more roles for discovered devices.

In at least one of the various embodiments, network packets associated with discovered devices may be examined and one or more heuristics may be used to determine the discovered device may be routing network traffic or if it may be originating network traffic. In at least one of the various embodiments, the NMD may determine if discovered devices may be routing network traffic rather than originating it based in part on various attributes of network packets associated with such devices, such as, the number of IP addresses, varying hop counts, IP ID distributions, or so forth.

In at least one of the various embodiments, the NMD may determine that some monitored network packets may include information for network management services/protocols, such as Dynamic Host Configuration Protocol (DHCP), Domain Name Service (DNS), NETBIOS, or the like. In at least one of the various embodiments, the NMD may be configured to recognize these and other well-known protocols. Information available in these common protocols may also be used for determining the one or more roles for a discovered device. Also, in at least one of the various embodiments, the fact that a device is emitting these types of network packets may contribute the role determination. For example, in at least one of the various embodiments, a discovered device that is emitting DHCP discovery requests may be identified with a role such as "DHCP client." Similarly, in at least one of the various embodiments, a discovered device that is observed emitting a DHCP offer message may be identified with a role, such as, DHCP server.

In at least one of the various embodiments, the NMD may passively monitor the network packets used by active discovery protocols to glean information the may be used for identifying the roles of the discovered devices. In other words, the NMD may passively piggy back on other active discovery protocols and network management protocols that may be operative on the monitored networks to further identify devices and the one or more roles of the discovered devices. In at least one of the various embodiments, the NMD may be arranged to examine and recognize more or fewer protocols that are discussed herein without departing from the spirit and scope of the innovation disclosed herein.

In at least one of the various embodiments, the NMD may perform active tests and/or probes of the monitored networks to discover roles that may associated with discovered devices. In some embodiments, one or more active tests may be triggered based on the results from passive discovery techniques. In at least one of the various embodiments, an NMD may be arranged and/or configured to confirm the existence of one or more discovered application by actively contacting them. For example, the NMD could determine if a particular device is associated with a database server role by opening a connection to one or more ports that one or more database servers are known to listen on. If a database server listening on one of the ports responds, it may confirm its presence. In at least one of the various embodiments, the NMD may determine if and how to actively probe devices based on one or more defined rule based policies.

In at least one of the various embodiments, one or more role discovery techniques may be used together to determine the one or roles associated with a discovered device. In at least one of the various embodiments, a confidence score may be generated based on the amount of evidence collected that indicates a particular role for device. For example, in at least one of the various embodiments, explicit roles that may be determined based on observing discovery protocol announcements (CDP, LLDP) may be have a high confidence score. While, in at least one of the various embodiments, roles indicated by less determinative tests and/or heuristics may result in a lower confidence score.

At block 608, in at least one of the various embodiments, network packets that include OSI Layer 4 through Layer 7 data may be examined by the NMD. In at least one of the various embodiments, the NMD may examine data included in Layer 4 and above in the observed network packets to gain further information about the discovered devices. In at least one of the various embodiments, such information may include, details regarding the applications operative on the discovered device, operating system information, application dependencies, or the like, or combination thereof, (See, FIGS. 7-9 for additional description.)

In at least one of the various embodiments, the NMD may optionally loop back to block 606 to employ information gathered at this step (block 608) for use in additional role discovery for the discovered devices.

At block 610, in at least one of the various embodiments, applications and role information may be associated with the corresponding discovered devices. In at least one of the various embodiments, by employing passive discovery techniques the NMD may determine one or more (often many) properties about the discovered devices. In at least one of the various embodiments, these properties may be associated with the discovered device using one or more well-known data structures to generate a device profile, property sheet, or the like. In at least one of the various embodiments, the device profile may be stored in, a database, data storage 270 data storage 410, or the like. In at least one of the various embodiments, the device profile may be indexed using various keys such as device name, IP address, MAC address, vendor, role, application, or the like, or combination thereof, to enable retrieval of device profile as needed. Further, in at least one of the various embodiments, even though the collection of device/application/role properties may be described as an express profile data structure that may be associated with device, it may also be implied based one or more relationships between the device and the determined properties.

In at least one of the various embodiments, as additional information about a device may be discovered it may be included and/or associated with the device profile corresponding to the discovered device. In some embodiments, the device profile may include application profiles, operating system profiles, or the like.

At decision block 612, in at least one of the various embodiments, if there are more network packets to monitor, control may loop back to block 602. Otherwise, in at least one of the various embodiments, control may be returned to a calling process. In at least one of the various embodiments, the NMD may be enabled to continuously monitor network packets on the monitored networks.

In at least one of the various embodiments, the device profiles as well as other information collected by the NMD may be updated dynamically in real-time based on the observed network packets. Accordingly, in at least one of the various embodiments, the roles associated with a discovered device may automatically change over the course of being monitored. For example, the NMD may initially determine that a discovered device has a database role, but later observes HTTP packets originating from the discovered device causing the NMD to additionally associate the role "web server" to the device's profile. In such cases, if the device ceases to participate in database transactions, the database role may be removed from its profile for the duration during which it did not participate in these database sessions.

Figure 7:
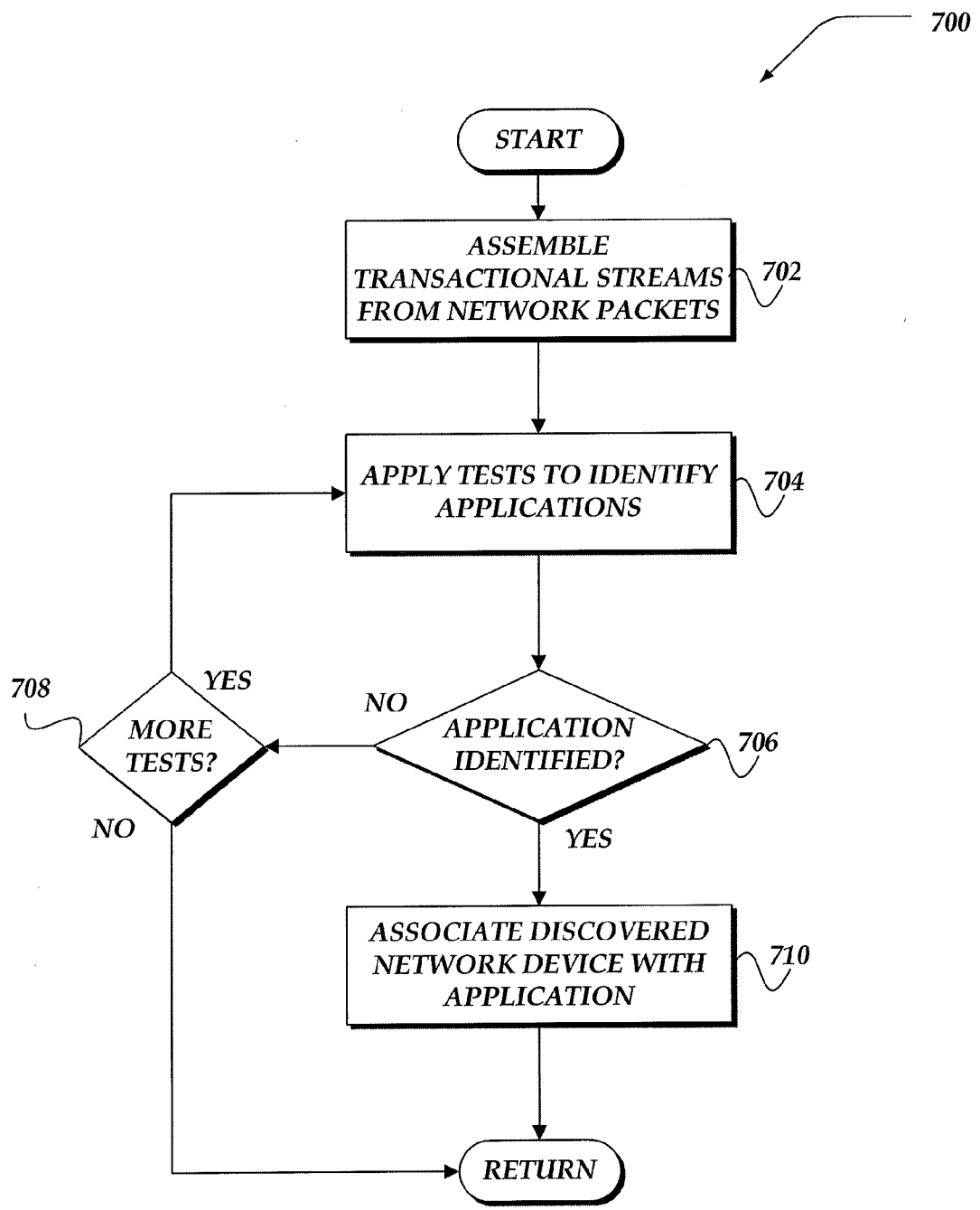
FIG. 7 shows a flowchart for a process for applying test to identify applications in accordance with at least one of the various embodiments.

FIG. 7 shows a flowchart for process 700 for applying tests to identify applications in accordance with at least one of the various embodiments. After a start block, at block 702, in at least one of the various embodiments, application transactional streams may be assembled from one or more of the monitored network packets. In at least one of the various embodiments, one or more network packets captured by the NMD may be used to re-assemble an application transaction that may have been broken into multiple network packets. In at least one of the various embodiments, there may be a variety of reasons, application transactional stream may be broken into multiple network packets, such as, device constraints, data type, network capacity, or like. For example, if the amount of data comprising an application transaction exceeds a defined Maximum Transmission Unit (MTU) the application transaction may be broken into multiple network packets.

In at least one of the various embodiments, various methods that may rely on one or more known characteristics of the network protocols operative on the monitored networks may be employed by the NMD to re-assemble the application transaction. For example, some network protocols, such as TCP, may include sequence numbers in the network packets that may used to reconstruct an application transaction from multiple network packets. In at least one of the various embodiments, the NMD may examine network packets that include bit patterns and/or signatures that may indicate the beginning and end of application level transaction.

In at least one of the various embodiments, re-assembly may not be required if the application transaction may be included in a single observed network packet.

At block 704, various tests, including heuristics and signature matching may be applied to the assembled application transaction. In at least one of the various embodiments, the NMD may be arranged to include a plurality of tests for identifying applications and application properties from data provided by captured network packets.

In at least one of the various embodiments, application transactions may include patterns and values that may be used to determine the applications that may be operative on the monitored networks. In at least one of the various embodiments, for some devices information useful for the determining the application details may be already present in the device profile. In other cases, in at least one of the various embodiments, the NMD may determine the information by examining the payload data of one or more network packets.

In at least one of the various embodiments, the specific methods and tests effective for identifying different applications may vary depending on the individual application and/or the characteristics of the network protocol being employed by the application.

In at least one of the various embodiments, the various tests used for identifying the applications may be arranged using one or more data structures, such as, lists, arrays, hashed, or the like, or combination thereof. Further, the tests may be persisted in a database, or the like. In at least one of the various embodiments, may be classified into categories based on characteristics, such as, how the test works, the kind of application targeted, or the like.

In at least one of the various embodiments, some tests may require one or more network packets and/or application transactions to be examined to identify matches. In such cases, information contained within multiple application transactions may be used to determine the identity of the application involved. For example, an application may include a correlation ID (e.g., a GUID) in requests and responses. Thus, in at least one of the various embodiments, since the NMD may be monitoring all of the network traffic on the wire it may be arranged to track these GUIDs thereby identifying the server and clients of an application.

In at least one of the various embodiments, the NMD may perform active tests and/or probes of the monitored networks to discover applications. In some embodiments, one or more active tests may be triggered based on the results from passive discovery techniques. In at least one of the various embodiments, an NMD may be arranged and/or configured to confirm the existence of one or more discovered application by actively contacting them. For example, the NMD could determine if a particular device acts as a MySQL server by opening a TCP connection to port 3306. A MySQL server listens on that port and will respond with a banner that confirms its presence. In at least one of the various embodiments, the NMD may determine if and how to actively probe devices based on one or more defined rule based policies.

In at least one of the various embodiments, the NMD may examine captured network packets to look for correlations between types of communication protocols and/or different network streams that may indicate the existence of a particular application. For example, users of an application may use a web browser to submit a username and password over HTTP to obtain credentials that may be used by another process that may be using a different network protocol to communicate. In this case, the NMD may correlate the two parts of the transaction by observing the presence of the shared credential in the Layer 4 payload of the monitored network packets even though monitored packets were in different streams and/or using different protocols.

In at least one of the various embodiments, the correlation of the application data may be made between network packets that may be on different network flows. In this circumstance, the L2 and L3 data in network packets may be insufficient to determine if an application-level correlation may be exist. Accordingly, the NMD may examine Layer 4 data of the network packets even if the Layer 2 and Layer 3 information suggests that network packets may be unrelated.

In at least one of the various embodiments, the NMD may prioritize the tests for identifying application based on one or more factors, including, success rate, performance impact, user defined priority, or the like.

In at least one of the various embodiments, tests may be selected based on Layer 2 and Layer 3 information. Also, in at least one of the various embodiments, information that may be included in the device profile (if any) may be used by the NMD to select and/or eliminate application tests from being applied. For example, if the device profile of the device associated with captured network packets indicates that the discovered device is a router, the NMD may be configured to forgo application testing for network packets associated with that device.

In at least one of the various embodiments, application tests may employ pattern matching techniques such as regular expressions. In some embodiments, application tests may include multiple steps and/or may be implemented using programming languages, such as, Perl, Python, Erlang, Java, C, C++, or the like, or combination thereof.

At decision block 706, in at least one of the various embodiments, if an application may be identified, control may flow to block 710. Otherwise, in at least one of the various embodiments, control may flow to decision block 708.

In at least one of the various embodiments, there may be various reasons why the NMD may fail to identify an application, including, absence of a relevant test, user configuration, missing and/or dropped data, or the like.

At decision block 708, if there may be more tests to perform, control may loop back to block 704. Otherwise, control may be returned to a calling process. In at least one of the various embodiments, testing may be done in phases where one or more tests maybe applied during each phase. In some embodiments, tests may be run one at time. And, in at least one of the various embodiments, tests may be applied using a defined priority order.

At block 710, in at least one of the various embodiments, the discovered application may be associated with the network device that provided the network packets. In at least one of the various embodiments, if one or more captured network packets may be determined to be an identified application transaction there may be additional of information about the application that may be determined. In at least one of the various embodiments, the determined application information may be expressly and/or implicitly associated with the device profile of the discovered device that may be associated with the application. In at least one of the various embodiments, the results of tests may be layered in the sense that more than one test may contribute information for the same application.

In at least one of the various embodiments, information about the application that may be determined may include, name, version, licensing information, server or client application, character encoding, or the like, or combination thereof.

In at least one of the various embodiments, the determined application information may be arranged expressly and/or implicitly into an application profile that may include the information about a particular application may be determined by the NMD. In at least one of the various embodiments, one or more application profiles may be associated with a device profile depending on the number of applications that the NMD determined could be associated with the device. Next, control may be returned to a calling process.

Figure 8:
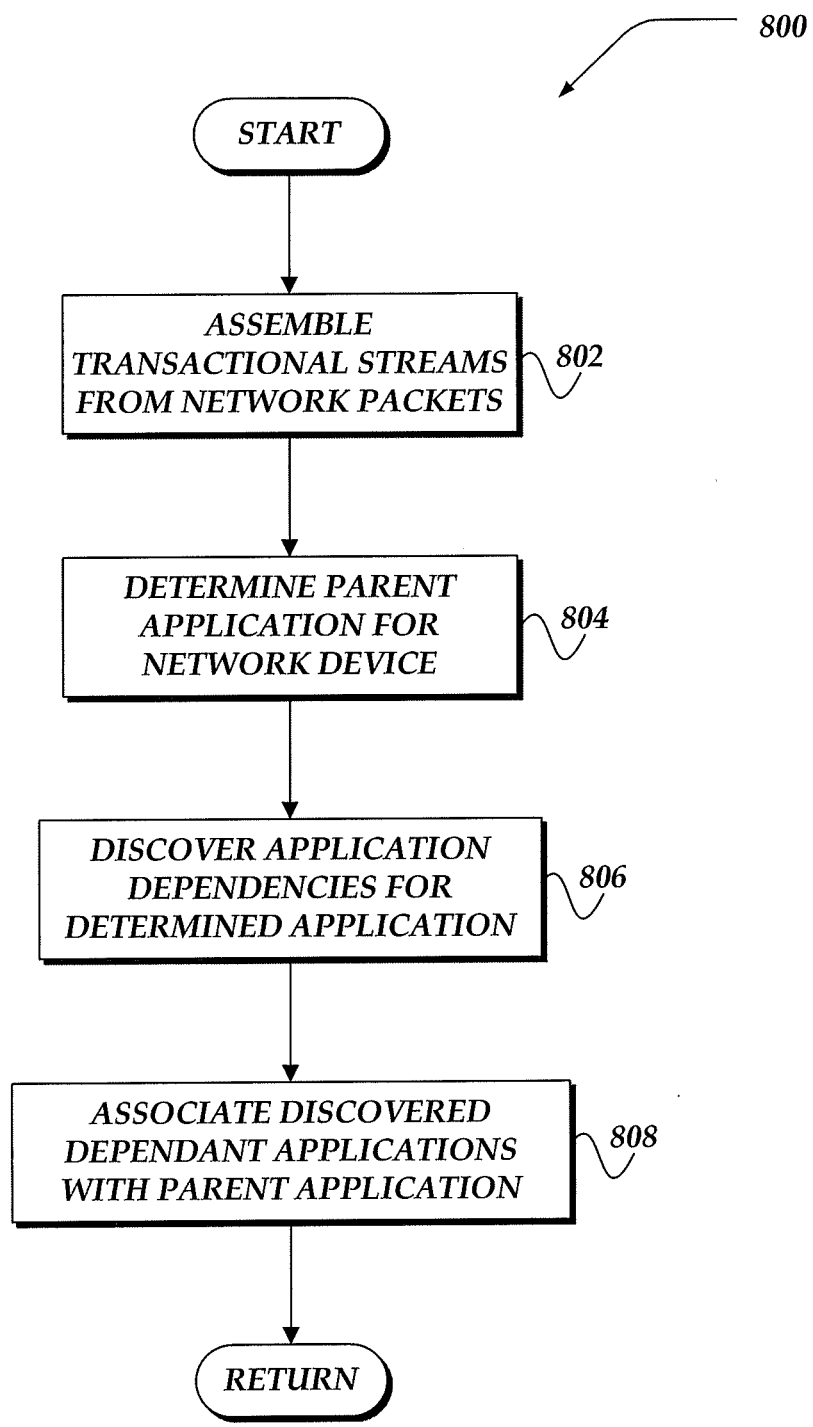
FIG. 8 shows a flowchart for a process for determining application dependences in accordance with at least one of the various embodiments.

FIG. 8 shows a flowchart for process 800 for determining application dependences in accordance with at least one of the various embodiments. In at least one of the various embodiments, the applications that may be associated with a device may be dependent and/or related to other discovered devices based on the application information. For example, in at least one of the various embodiments, some discovered devices may running a server version of an application, while other discovered devices may host client versions of the applications. Identifying application dependencies enables device dependencies to be discovered, some of which may be non-obvious absent the NMD's analysis of the OSI Layer 4-7 data.

After a start block, at block 802, in at least one of the various embodiments, application transactional streams (transactions) may be assembled from one or more of the monitored network packets. See, discussion for block 702.

At block 804, in at least one of the various embodiments, a parent application may be determined based on the application transaction. In at least one of the various embodiments, OSI Layer 4 and above network packet payloads may be examined by the NMD to determine relationships between the various discovered devices based on one or more of the applications that may have been discovered. In at least one of the various embodiments, a discovered device may be considered to be operating as a parent (e.g., servers) for a particular discovered application relative to devices that may be using the same application (e.g., clients)

In at least one of the various embodiments, network packet payloads associated with the discovered applications may be examined by the NMD to determine if the discovered device may be hosting an application that may be associated with dependant applications. In at least one of the various embodiments, the actual tests may include analysis that may be performed in conjunction with process 700. In at least one of the various embodiments, information obtained about an application during the application identification process (process 700) may include information that may indicate that the application may be operating as a parent (server) application.

For example, a discovered device may be determined by the NMD to be issuing HTTP responses to one or more requestors. Such information may indicate that the discovered device may be a HTTP server.

At block 806, in at least one of the various embodiments, application dependencies for the parent application may be determined. In at least one of the various embodiments, during the test and analysis in process 700, one or more applications running on discovered devices may be determined. In at least one of the various embodiments, in some case, discovered applications may have a dependency on another instance of the same application. For example, in at least one of the various embodiments, a client application, such as, a terminal server client may be running on a discovered device while the terminal server application may be running on another discovered device. Thus, on this basis, a dependency between the two discovered devices may be determined.

In at least one of the various embodiments, the NMD may discover application dependencies between components of multi-tier applications where each component may be an application separately discovered by the NMD. For example, the NMD may discover a multi-tier application that is comprised of a web server front-end, a caching tier, a middle-ware tier, a database tier, and a storage tier. In some cases, the NMD may discover each tier and determine them as separate applications operating on the monitored networks. By employing application dependency analysis, the NMD may discover that the applications are related and/or dependent on each other. In at least one of the various embodiments, applications determined to be operating on a discovered device may be dependant on another application operating on a different discovered device. For example, in at least one of the various embodiments, a web application operative on one discovered device may be dependent on a database application is operative on a different device.

At block 808, in at least one of the various embodiments, the dependent applications may be associated with parent application. In at least one of the various embodiments, the dependencies relationships between the applications and/or the discovered device may be stored and indexed. In at least one of the various embodiments, the application dependency information may be included in and/or associated with the device profiles. In some cases, in at least one of the various embodiments, a discovered device may operate both as a parent application and a child application depending on circumstances. Likewise, in at least one of the various embodiments, the NMD may determine that a discovered device may be running multiple instances of the same application with some of them having different dependency relationships.

Further, in at least one of the various embodiments, some dependent applications may be peers of each other, such that the NMD may recognize the applications and/or devices hosting the application may be related even though a parent-child relationship may be absent.

In at least one of the various embodiments, the dependency information may be stored in a database and may support queries for identifying dependencies between and among the discovered devices, between the applications running on the discovered devices, or the like, or a combination thereof. In at least one of the various embodiments, a dependency information database may support searches or queries that return sets of devices based their associated application dependencies. Further, in at least one of the various embodiments, the application dependency information may be included in, or associated with, the device profile for the discovered devices that may be determined to be associated with the determined application dependencies. In at least one of the various embodiments, the application dependency information may be included in one or more application profiles that may be associated with the application having the determined dependency relationships. Next, control may be returned a calling process.

Figure 9:
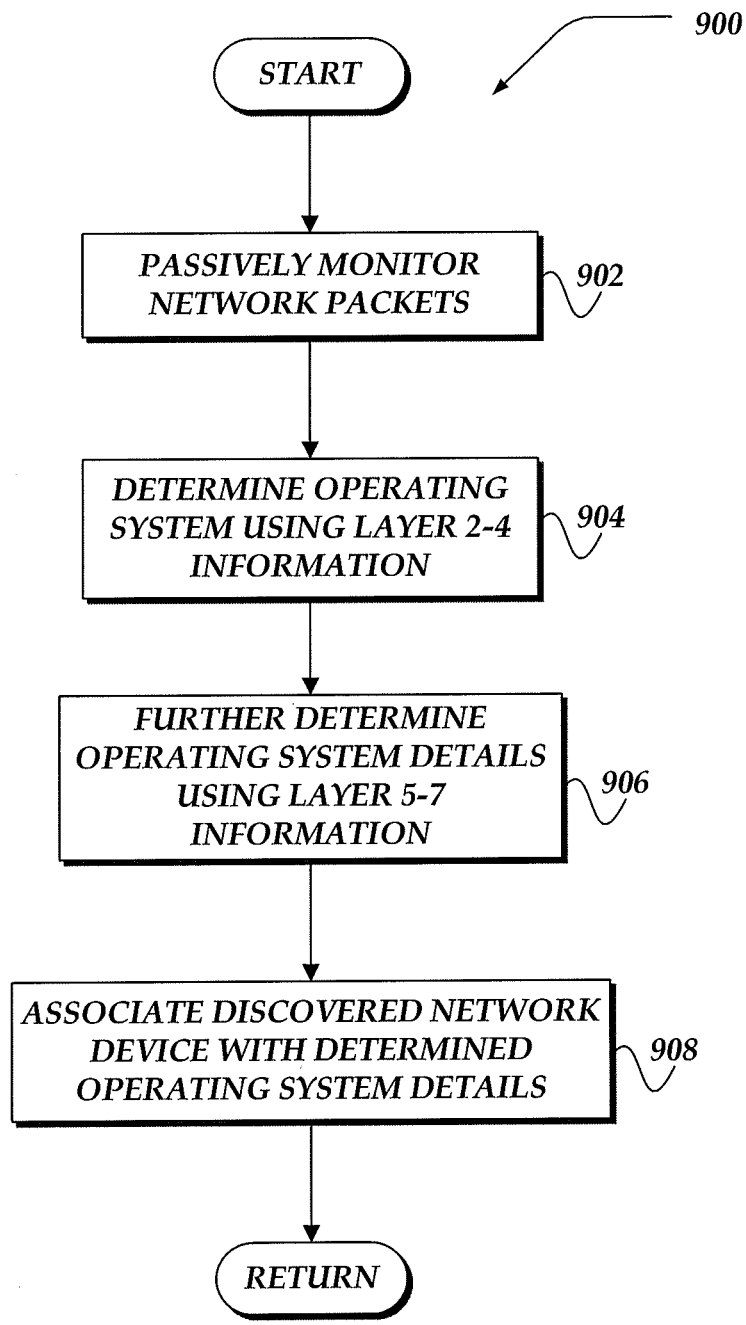
FIG. 9 shows a flowchart for a process for passively determining operating systems in accordance with at least one of the various embodiments.

FIG. 9 shows a flowchart for process 900 for passively determining operating systems in accordance with at least one of the various embodiments. In at least one of the various embodiments, the NMD may examine and analyze captured network packets to determine details about the operating system that may operative on one or more discovered devices.

After a start block, at block 902, one or more networks may be passively monitored for network packets. In at least one of the various embodiments, as discussed above the NMD may be provided one or more network streams that include network packets emitting from one or more network devices that may be operative on the monitored network.

At block 904, in at least one of the various embodiments, basic operating system information may be determined using OSI Layer 2-4 information. In at least one of the various embodiments, the NMD may analyze the OSI Layer 2-4 information of captured network packets as part of determining operating system information about the network device the emitted the network packets. In at least one of the various embodiments, OSI Layer 2-4 information, such as, TCP options includes in TCP packet, may be analyzed to provide an indication of the type of the one or more operating systems that may be running on a discovered device.

In at least one of the various embodiments, the NMD may examine the OSI Layer 2-4 data to determine if there may be patterns and/or values that indicate a particular operating system. Similar, to process 700, multiple tests may be employed to test for multiple operating systems. Information discovered during this analysis may be added to the device profiles for the discovered device corresponding to the captured network packets.

At block 906, in at least one of the various embodiments, additional operating system details may be determined using OSI Layer 5-7 information. In at least one of the various embodiments, the NMD may look deeper into the network packets to analyze the application-level information that may be included in the network packet. In some cases, in at least one of the various embodiments, as part of this analysis, the NMD may re-assemble one or more network packets into a larger application transaction. See, FIG. 7, process 700, block 702. For example, in at least one of the various embodiments, HTTP packets emitted from a discovered device may include HTTP header information that describes the operating system of the discovered device (e.g., HTTP protocol's User-Agent and Server headers field).

At block 908, in at least one of the various embodiments, the discovered network devices may be associated with each discovered operating system and its details. In at least one of the various embodiments, the NMD may collect and correlate the OSI Layer 2-4 and OSI Layer 5-7 information to determine a detailed operating system profile for discovered devices. In at least one of the various embodiments, this information may be added to the device profiles that correspond to the discovered devices that emitted and/or received the monitored network packets. Also, in at least one of the various embodiments, the operating system information may be indexed separately in a database, or the like. In any event, the operating system information may be persisted such that queries such as, "select all devices running Windows 3.1" may produce a result set that includes all discovered devices that the NMD has determined are running the operating system Windows 3.1, and so forth.

In at least one of the various embodiments, the determined operating system information may be arranged expressly and/or implicitly into an operating system profile that may include the information about a particular operating system determined by the NMD. In at least one of the various embodiments, one or more operating system profiles may be associated in each device profiles, with the number depending on how many operating systems the NMD detected running on the discovered device. Next, in at least one of the various embodiments, control may be returned to a calling process.

In at least one of the various embodiments, a NMD may be arranged to more or less simultaneously perform some or all of process 700, 800, and 900 even though they are describe separately. For example, in at least one of the various embodiments, while discovering applications, the NMD may also perform the actions to discover application dependencies and operating system details. Further, in at least one of the various embodiments, information about the discovered devices and/or the discovered applications may be accumulated at different stages of the discovery process. For example, in at least one of the various embodiments, one stage of analysis may discover the vendor of a discovered device, while another stage discovers the operating system, and while still further, another stage discovers the operating system version, and so forth.

Also, in at least one of the various embodiments, the amount of detail discoverable about a device and the applications the device may be hosting may depend on the characteristics and payloads of the network packets emitted and received by the discovered devices. For example, in at least one of the various embodiments, a first discoverable device may have a web server running that includes operating system version information in HTTP responses it sends to clients. Whereas a second discovered device running the same kind of web server application may be configured such that the operating system information is not included in its HTTP responses. Thus, the NMD may employ different tests and technique to discover that both devices may be running same type and version web server application. In at least one of the various embodiments, however, as discussed above, the NMD may apply more than one test and/or discovery method if it may be examining monitored network packets. Thus, continuing with the last example, in at least one of the various embodiments, even if the web server of the second device is configured to hide the operating information, the NMD may discover detailed operating system information by analyzing other network packets sent and received by the second device.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for monitoring communication over a network with a network device that is operative to perform actions, comprising:
   passively monitoring a plurality of packets on the network, wherein the monitored packets include at least a portion of data associated with layers four through seven (L4-L7 data) of the Open Systems Interconnection (OSI) model; and
   discovering one or more other network devices on the network based on examining the L2-L3 data associated with the at least one or more other network device, wherein one or more determined roles for the one or more other network devices corresponds to a confidence score; and
   discovering at least one application that is operating on the network based on testing the L4-L7 data that is included in each transaction, wherein at least a portion of the L4-L7 data is scanned to identify at least one pattern of at least one application transaction that is associated with the at least one application, and wherein each pattern is at least one of previously provided or determined from payload data for at least one network packet.

2. The method of claim 1, further comprising, determining at least one correlation between at least one application and another application based on at least a comparison of a plurality of transactions that are associated with one or more flows of packets on the network.

3. The method of claim 1, further comprising, determining at least one dependency between the at least one application and another application based on at least a comparison of a plurality of transactions that are associated with one or more network devices.

4. The method of claim 1, wherein determining the one or more roles for the one or more other network devices is based on examining the L4-L7 data associated with the one or more other network device, and wherein the one or more roles include web server, database, router, switch, directory server, printer, or network attached storage.

5. The method of claim 1, further comprising, generating at least one application profile that includes at least an identity of the at least one application.

6. The method of claim 1, wherein discovering the at least one application based on testing the L4-L7 data that is included in each transaction, further comprises at least one of:
   employing at least one heuristic technique based on at least one known property of the at least one application; or
   determining the at least one application based on an accumulation of L4-L7 data from a plurality of transactions.

7. A system arranged for monitoring communication over a network, comprising:
   a server device, including:
      a transceiver that is operative to communicate over the network;
      a memory that is operative to store at least instructions; and
      a processor device that is operative to execute instructions that enable actions, including:
         passively monitoring a plurality of packets on the network, wherein the monitored packets include at least a portion of data associated with layers four through seven (L4-L7 data) of the Open Systems Interconnection (OSI) model; and
      discovering one or more other network devices on the network based on examining the L2-L3 data associated with the at least one or more other network device, wherein one or more determined roles for the one or more other network devices corresponds to a confidence score; and
      discovering at least one application that is operating on the network based on testing the L4-L7 data that is included in each transaction, wherein at least a portion of the L4-L7 data is scanned to identify at least one pattern of at least one application transaction that is associated with the at least one application, and wherein each pattern is at least one of previously provided or determined from payload data for at least one network packet; and
   a client device, comprising,
      a transceiver that is operative to communicate over the network;
      a memory that is operative to store at least instructions; and
      a processor device that is operative to execute instructions that enable actions, including displaying at least a portion of at least one application profile that includes at least an identity of the at least one application.

8. The system of claim 7, wherein the actions enabled by the server device's processor device further comprise determining at least one correlation between at least one application and another application based on at least a comparison of a plurality of transactions that are associated with one or more flows of packets on the network.

9. The system of claim 7, wherein the actions enabled by the server device's processor device further comprise determining at least one dependency between the at least one application and another application based on at least a comparison of a plurality of transactions that are associated with one or more network devices.

10. The system of claim 7, wherein discovering the at least one application based on testing the L4-L7 data that is included in each transaction, further comprises at least one of:
   employing at least one heuristic technique based on at least one known property of the at least one application; or
   determining the at least one application based on an accumulation of L4-L7 data from a plurality of transactions.

11. The system of claim 7, wherein the actions enabled by the service device's processor device further comprise determining at least one operating system that is associated with the at least one other network device based on testing the at least portion of L4-L7 data included in the monitored packets.

12. A network device that is operative for monitoring communication over a network, comprising:
- a transceiver that is operative to communicate over a network;
- a memory that is operative to store at least instructions; and
- a processor device that is operative to execute instructions that enable actions, including:
    - passively monitoring a plurality of packets on the network, wherein the monitored packets include at least a portion of data associated with layers four through seven (L4-L7 data) of the Open Systems Interconnection (OSI) model; and
    - discovering one or more other network devices on the network based on examining the L2-L3 data associated with the at least one or more other network device, wherein one or more determined roles for the one or more other network devices corresponds to a confidence score; and
    - discovering at least one application that is operating on the network based on testing the L4-L7 data that is included in each transaction, wherein at least a portion of the L4-L7 data is scanned to identify at least one pattern of at least one application transaction that is associated with the at least one application, and wherein each pattern is at least one of previously provided or determined from payload data for at least one network packet.

13. The network device of claim 12, wherein the actions enabled by the network device's processor device further comprise determining at least one correlation between at least one application and another application based on at least a comparison of a plurality of transactions that are associated with one or more flows of packets on the network.

14. The network device of claim 12, wherein the actions enabled by the network device's processor device further comprise determining at least one dependency between the at least one application and another application based on at least a comparison of a plurality of transactions that are associated with one or more network devices.

15. The network device of claim 12, wherein the actions enabled by the network device further comprise determining the one or more roles for the one or more other network devices based on examining the L4-L7 data associated with the one or more other network device, and wherein the one or more roles include web server, database, router, switch, directory server, printer, or network attached storage.

16. The network device of claim 12, wherein the actions enabled by the network device's processor device further comprise generating at least one application profile that includes at least an identity of the at least one application.

17. The network device of claim 12, wherein discovering the at least one application based on testing the L4-L7 data that is included in each transaction, further comprises at least one of:
- employing at least one heuristic technique based on at least one known property of the at least one application; or
- determining the at least one application based on an accumulation of L4-L7 data from a plurality of transactions.

18. A processor readable non-transitive storage media that includes instructions for monitoring communication over a network with a network device, wherein execution of the instructions by a processor device enables actions, comprising:
- passively monitoring a plurality of packets on the network, wherein the monitored packets include at least a portion of data associated with layers four through seven (L4-L7 data) of the Open Systems Interconnection (OSI) model; and
- discovering one or more other network devices on the network based on examining the L2-L3 data associated with the at least one or more other network device, wherein one or more determined roles for the one or more other network devices corresponds to a confidence score; and
- discovering at least one application that is operating on the network based on testing the L4-L7 data that is included in each transaction, wherein at least a portion of the L4-L7 data is scanned to identify at least one pattern of at least one application transaction that is associated with the at least one application, and wherein each pattern is at least one of previously provided or determined from payload data for at least one network packet.

19. The media of claim 18, wherein the actions enabled by the network device's processor device further comprise determining at least one correlation between at least one application and another application based on at least a comparison of a plurality of transactions that are associated with one or more flows of packets on the network.

20. The media of claim 18, wherein the actions enabled by the network device's processor device further comprise determining at least one dependency between the at least one application and another application based on at least a comparison of a plurality of transactions that are associated with one or more network devices.

\* \* \* \* \*

UNITED STATES PATENT AND TRADEMARK OFFICE
CERTIFICATE OF CORRECTION

PATENT NO.          : 9,054,952 B2
APPLICATION NO.     : 14/107580
DATED               : June 9, 2015
INVENTOR(S)         : Rothstein et al.

It is certified that error appears in the above-identified patent and that said Letters Patent is hereby corrected as shown below:

In the specification

In Column 1, Line 8, delete "Mar. 15, 2013," and insert -- Mar. 15, 2013, now Pat. No. 8,626,912, --, therefor.

In Column 7, Line 7, delete "in a" and insert -- in an --, therefor.

In Column 14, Line 37, delete "WML Script," and insert -- WMLScript, --, therefor.

In Column 21, Line 26, delete "the may" and insert -- may --, therefor.

In Column 25, Line 56, delete "(e.g., clients)" and insert -- (e.g., clients). --, therefor.

Signed and Sealed this
Second Day of August, 2016

Michelle K. Lee
*Director of the United States Patent and Trademark Office*